US012724239B2

(12) United States Patent
Tang et al.

(10) Patent No.: US 12,724,239 B2
(45) Date of Patent: Sep. 1, 2026

(54) CAMERA OPTICAL LENS

(71) Applicant: AAC Optics (Suzhou) Co., Ltd., Suzhou (CN)

(72) Inventors: Han Tang, Suzhou (CN); Shunda Zhou, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 296 days.

(21) Appl. No.: 18/544,524

(22) Filed: Dec. 19, 2023

(65) Prior Publication Data

US 2024/0427116 A1 Dec. 26, 2024

(30) Foreign Application Priority Data

Jun. 26, 2023 (CN) ........................ 202310755753.2

(51) Int. Cl.
*G02B 13/00* (2006.01)

(52) U.S. Cl.
CPC ................................ *G02B 13/0045* (2013.01)

(58) Field of Classification Search
None
See application file for complete search history.

(56) References Cited

U.S. PATENT DOCUMENTS

| | | | | |
|---|---|---|---|---|
| 2014/0063323 | A1* | 3/2014 | Yamazaki | G02B 13/0045 359/713 |
| 2017/0299846 | A1* | 10/2017 | Lin | G02B 13/0045 |
| 2020/0409048 | A1* | 12/2020 | Ma | G02B 27/0012 |
| 2020/0409055 | A1* | 12/2020 | Ma | G02B 13/0045 |
| 2021/0041662 | A1* | 2/2021 | Oinuma | G02B 9/62 |
| 2021/0063694 | A1* | 3/2021 | Li | G02B 9/62 |
| 2022/0196984 | A1* | 6/2022 | Sakaguchi | G02B 13/0045 |
| 2025/0093620 | A1* | 3/2025 | Tang | G02B 13/18 |

* cited by examiner

*Primary Examiner* — Ryan Crockett
(74) *Attorney, Agent, or Firm* — Wiersch Law Group

(57) ABSTRACT

The present application relates to the field of optical lenses and discloses a camera optical lens, including, in order from the objective side to the image side: a first lens, a second lens, a third lens, a fourth lens, a fifth lens, and a sixth lens. The following relationship expressions are satisfied: $-3.00 \leq f6/f \leq -1.00$; $0.07 \leq BF/TTL \leq 0.20$; $2.00 \leq R10/R9 \leq 10.00$; $0.30 \leq d2/d4 \leq 30.00$. The present application has superior optical performance and low optical distortion.

10 Claims, 11 Drawing Sheets

20

S1 L1 L2 L3 L4 L5 L6 GF Si

CAMERA OPTICAL LENS

TECHNICAL FIELD

The present application relates to the field of optical lenses, in particular to a camera optical lens applicable to handheld terminal devices such as smartphones and digital cameras, as well as camera devices such as monitors, PC lenses, and LIDAR lenses.

BACKGROUND

In recent years, with the rise of smartphones and the rapid development of autonomous driving, optical lenses used in automotive applications are increasingly prevalent in the field of autonomous driving. The demand for small-sized camera lenses has also grown. Typically, image sensors in camera lenses are either Charge-Coupled Devices (CCD) or Complementary Metal-Oxide-Semiconductor Sensors (CMOS Sensors). Advances in semiconductor manufacturing technology have led to smaller pixel sizes in image sensors. Coupled with the trend of electronic products being compact and lightweight while offering advanced features, small-sized camera lenses with excellent imaging quality have become mainstream in the current market. To achieve superior imaging quality, conventional lenses used in smartphone cameras often adopt a three-element or four-element lens structure. Furthermore, with technological advancements and increasing user demands, the pixel area of image sensors continues to decrease, and there is a growing requirement for optical systems to deliver higher imaging quality. In this context, a six-element lens structure has gradually become incorporated into lens designs. There is an urgent need for wide-angle camera optical lenses that exhibit excellent optical characteristics and ultra-thinness, and LIDAR lenses with superior optical performance.

SUMMARY

In response to the above problem, an object of the present application is to provide a camera optical lens having superior optical performance and small optical distortion.

In order to solve the above technical problems, the present application proposes a camera optical lens, comprising, in order from an objective side to an image side: a first lens, a second lens, a third lens, a fourth lens, a fifth lens, and a sixth lens;

wherein a focal length of the sixth lens is f6; a focal length of the camera optical lens is f; an on-axis distance from an image surface of the sixth lens to an image surface of the camera optical lens is BF; an optical total length of the camera optical lens is TTL; a central radius of curvature of an image side of the fifth lens is R10; a central radius of curvature of an objective side of the fifth lens is R9; an on-axis distance from an image side of the first lens to an objective side of the second lens is d2; an on-axis distance from an image side of the second lens to an objective side of the third lens is d4, and the following relationship expressions are satisfied:

$$-3.00 \leqq f6/f \leqq -1.00;$$

$$0.07 \leqq BF/TL \leqq 0.20;$$

$$2.00 \leqq R10/R9 \leqq 10.00;$$

-continued $$0.30 \leqq d2/d4 \leqq 30.00.$$

In one embodiment, an on-axis distance from an image side of the third lens to an objective side of the fourth lens is d6; an on-axis thickness of the third lens is d5, and the following relationship expression is satisfied:

$$2.00 \leqq d6/d5 \leqq 8.00.$$

In one embodiment, a focal length of the fifth lens is f5; an on-axis thickness of the fifth lens is d9, and the following relationship expression is satisfied:

$$1.50 \leqq f5/d9 \leqq 6.00.$$

Preferably, a diameter of an objective side of the first lens is D; an image height of the camera optical lens is IH; a field of view in a diagonal direction of the camera optical lens is FOV, and the following relationship expression is satisfied:

$$D/IH/FOV \leqq 0.10.$$

In one embodiment, the first lens has a positive refractive force, and an objective side of the first lens is convex at a proximal-axis position;

a focal length of the first lens is f1; a central radius of curvature of the objective side of the first lens is R1; a central radius of curvature of the image side of the first lens is R2; an on-axis thickness of the first lens is d1, and the following relationship expressions are satisfied:

$$0.45 \leq f1/f \leq 1.56;$$

$$-2.32 \leq (R1+R2)/(R1-R2) \leq -0.35;$$

$$0.04 \leq d1/TTL \leq 0.22.$$

In one embodiment, the camera optical lens the following relationship expression is satisfied:

$$0.71 \leq f1/f \leq 1.25;$$

$$-1.45 \leq (R1+R2)/(R1-R2) \leq -0.43;$$

$$0.06 \leq d1/TTL \leq 0.18.$$

In one embodiment, the second lens has a positive refractive force; an objective side of the second lens is convex at a proximal-axis position, and an image side of the second lens is convex at a proximal-axis position;

a focal length of the second lens is f2; a central radius of curvature of the objective side of the second lens is R3; a central radius of curvature of the image side of the second lens is R4; an on-axis thickness of the second lens is d3; and an optical total length of the camera optical lens is TTL, and the following relationship expressions are satisfied:

$$1.21 \leq f2/f \leq 5.86;$$

$$-1.32 \leq (R3+R4)/(R3-R4) \leq 0.56;$$

$$0.04 \leq d3/TTL \leq 0.15.$$

In one embodiment, the camera optical lens the following relationship expression is satisfied:

$$1.94 \leq f2/f \leq 4.69;$$

$$-0.82 \leq (R3+R4)/(R3-R4) \leq 0.45;$$

$$0.06 \leq d3/TTL \leq 0.12.$$

In one embodiment, the third lens has a negative refractive force, and an image side of the third lens is concave at a proximal-axis position;

a focal length of the third lens is f3; a central radius of curvature of the objective side of the third lens is R5; a central radius of curvature of the image side of the third lens is R6; an on-axis thickness of the third lens is d5; an optical total length of the camera optic lens is TTL, and the following relationship expressions are satisfied:

$$-1.93 \leq f3/f \leq -0.51;$$

$$0.50 \leq (R5+R6)/(R5-R6) \leq 3.10;$$

$$0.01 \leq d5/TTL \leq 0.07.$$

In one embodiment, the camera optical lens the following relationship expression is satisfied:

$$-1.20 \leq f3/f \leq -0.63;$$

$$0.80 \leq (R5+R6)/(R5-R6) \leq 2.48;$$

$$0.02 \leq d5/TTL \leq 0.06.$$

In one embodiment, an objective side of the fourth lens is concave at a proximal-axis position, and an image side of the fourth lens is convex at a proximal-axis position; a focal length of the fourth lens is f4; a central radius of curvature of the objective side of the fourth lens is R7; a central radius of curvature of the image side of the fourth lens is R8; an on-axis thickness of the fourth lens is d7; an optical total length of the camera optic lens is TTL, and the following relationship expressions are satisfied:

$$-100.34 \leq f4/f \leq 10.67;$$

$$-96.58 \leq (R7+R8)/(R7-R8) \leq 231.07;$$

$$0.04 \leq d7/TTL \leq 0.30.$$

In one embodiment, the camera optical lens the following relationship expression is satisfied:

$$-62.71 \leq f4/f \leq 8.54;$$

$$-60.36 \leq (R7+R8)/(R7-R8) \leq 184.86;$$

$$0.06 \leq d7/TTL \leq 0.24.$$

In one embodiment, the fifth lens has a positive refractive force; an objective side of the fifth lens is convex at a proximal-axis position, and an image side of the fifth lens is concave at a proximal-axis position; a focal length of the fifth lens is f5; an on-axis thickness of the fifth lens is d9; an optical total length of the camera optic lens is TTL, and the following relationship expressions are satisfied:

$$0.41 \leq f5/f \leq 1.98;$$

$$0.06 \leq d9/TTL \leq 0.51.$$

In one embodiment, the camera optical lens the following relationship expression is satisfied:

$$0.66 \leq f5/f \leq 1.58;$$

$$-3.70 \leq (R9+R10)/(R9-R10) \leq -1.02;$$

$$0.10 \leq d9/TTL \leq 0.41.$$

In one embodiment, the sixth lens has a negative refractive force; a central radius of curvature of an objective side of the sixth lens is R11; a central radius of curvature of an image side of the sixth lens is R12; an on-axis thickness of the sixth lens is d11; an optical total length of the camera optical lens is TTL, and the following relationship expressions are satisfied:

$$-4.18 \leq (R11+R12)/(R11-R12) \leq 1.84;$$

$$0.01 \leq d11/TTL \leq 0.05.$$

In one embodiment, the camera optical lens the following relationship expression is satisfied:

$$-2.61 \leq (R11+R12)/(R11-R12) \leq 1.47;$$

$$0.01 \leq d11/TTL \leq 0.04.$$

In one embodiment, the optical total length TTL of the camera optical lens is less than or equal to 63.44 mm.

In one embodiment, the optical total length TTL of the camera optical lens is less than or equal to 60.56 mm.

In one embodiment, an aperture value FNO of the camera optical lens is less than or equal to 1.34.

In one embodiment, the aperture value FNO of the camera optical lens is less than or equal to 1.31.

In one embodiment, the first lens, third lens, fifth lens, and sixth lens are made of glass materials.

The beneficial effect of the present application is that the camera optical lens of the present application has superior optical performance and small optical distortion, and is particularly suitable for smartphone camera lens assemblies, WEB camera lenses, and LIDAR lenses comprising camera elements such as Charge Coupled Device (CCD), Complementary Metal-Oxide-Semiconductor Transistor (CMOS) and the like for high pixels.

DETAILED DESCRIPTION OF THE EMBODIMENTS

In order to make the objects, technical solutions, and advantages of the present application clearer, various embodiments of the present application will be described in detail below in connection with the accompanying drawings. However, those of ordinary skill in the art can understand that in the various embodiments of the present application, a number of technical details have been proposed in order to enable the reader to better understand the present application, and even without these technical details and various variations and modifications based on the following various embodiments, the technical solution claimed to be protected by the present application can be realized.

First Embodiment

Figure 1:
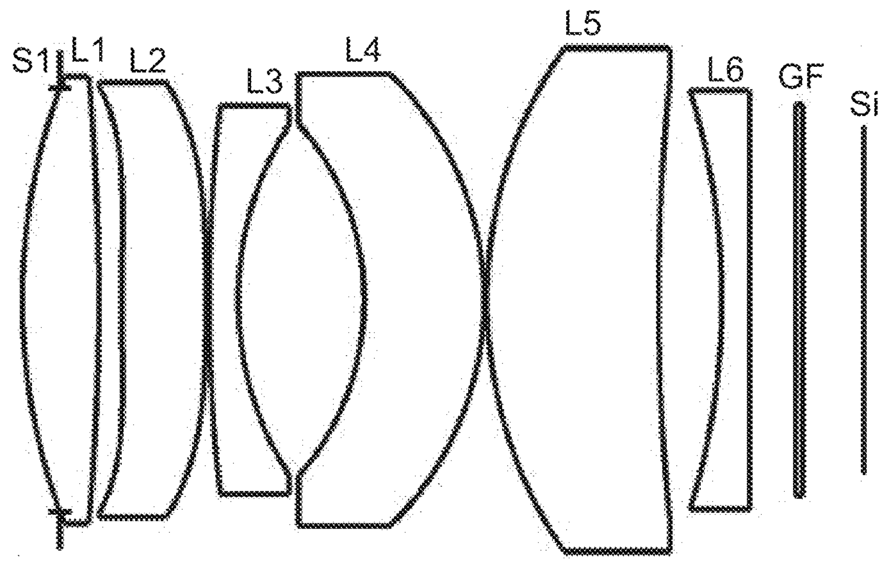
FIG. 1 is a structural schematic diagram of a camera optical lens according to the first embodiment of the present application.

As shown in the accompanying drawings, the present application provides a camera optical lens 10. FIG. 1 shows a camera optical lens 10 of the first embodiment of the present application, and the camera optical lens 10 includes six lenses. Specifically, the camera optical lens 10 includes, in order from an objective side to an image side: an aperture S1, a first lens L1, a second lens L2, a third lens L3, a fourth lens L4, a fifth lens L5, and a sixth lens L6, an optical element such as an optical filter GF may be provided between the sixth lens L6 and an image surface Si.

In this embodiment, the first lens L1 is made of glass material, the second lens L2 is made of glass material, the third lens L3 is made of glass material, the fourth lens L4 is made of plastic material, the fifth lens L5 is made of glass material, and the sixth lens L6 is made of glass material, which is conducive to improving system performance and system stability. In other embodiments, each lens may also be made of other materials.

It is defined that a focal length of the sixth lens L6 is f6, and a focal length of the camera optical lens 10 is f. The following relationship expression is satisfied: $-3.00 \le f6/f \le -1.00$, in which a ratio between of focal length of the last lens to the focal length of the system is specified. Within the range, it is conducive to collecting light and ensuring the amount of light throughput, and allows for a smaller Chief Ray Angle (CRA) to be achieved, in which $CRA \le 13.5$.

An on-axis distance from an image side of the sixth lens L6 to the image surface is BF, and the optical total length of the camera optical lens 10 is TTL. The following relationship expression is satisfied: $0.07 \le BF/TTL \le 0.20$, in which a range of a ratio of the back focal length BF to the total length TTL is specified. Within the range of the relationship expression, it is conducive to the assembly of the module, and the realization of the compact structure of the lens group, thereby reducing the sensitivity of the lens to the Modulation Transfer Function (MTF), and improving the production yields and the reducing the production cost.

A central radius of curvature of an image side of the fifth lens L5 is R10, and a central radius of curvature of an objective side of the fifth lens L5 is R9. The following relationship expression is satisfied: $2.00 \le R10/R9 \le 10.00$, in which the shape of the fifth lens L5 is specified. Within the range of the relationship expression, the bias degree of light passing through the lens can be moderated, thereby correcting the chromatic aberration effectively, in which the chromatic aberration $|LC| \le 2.0$ μm.

An on-axis distance from an image side of the first lens L1 to an objective side of the second lens L2 is d2, and an on-axis distance from an image side of the second lens L2 to an objective side of the third lens L3 is d4. The following relationship expression is satisfied: $0.30 \le d2/d4 \le 30.00$, in which a ratio of an air spacing between the first lens L1 and the second lens L2 to an air spacing between the third lens L3 and the fourth lens L4 is specified. By reasonably distributing the air spacing between the lenses, it is conducive to reducing the difficulty of assembly in the practical production process and improving the yield rate.

It is defined that an on-axis distance from an image side of the third lens L3 to an objective side of the fourth lens L4 is d6, and an on-axis thickness of the third lens L3 is d5. The following relationship expression is satisfied: $2.00 \le d6/d5 \le 8.00$, in which a ratio of the air spacing between the third lens L3 and the fourth lens L4 to the thickness of the third lens L3 is specified, which is conducive to buffering the light trend and correcting the image dispersion and the distortion of the camera lens. The distortion |Distortion| is ≤2% and the possibility of vignetting is reduced.

It is defined that a focal length of the fifth lens L5 is f5, and an on-axis thickness of the fifth lens L5 is d9. The following relationship expression is satisfied: $1.50 \le f5/d9 \le 6.00$. When f5/d9 satisfies the above relationship expression, it is conducive to buffering the change in an incident angle of the light from a large viewing angle in order to propagate smoothly through the optical imaging lens group, and maintaining the strength of the refractive force of the fifth lens, so as to improve the chromatic aberration and enhance the imaging quality.

It is defined that a diameter of an objective side of the first lens L1 is D, an image height of the camera optical lens 10 is IH, and a field of view in the diagonal direction of the camera optical lens 10 is FOV. The following relationship expression is satisfied: $D/IH/FOV \le 0.10$, which is conducive to controlling the front-end aperture when it is within the range of the relationship expression.

In this embodiment, the objective side of the first lens L1 is convex at a proximal-axis position, the image side of the first lens L1 is convex at a proximal-axis position, and the first lens L1 has a positive refractive force. In other embodiments, the objective side and image side of the first lens L1 may also be set to other concave and convex distributions.

It is defined that an overall focal length of the camera optical lens 10 is f, and a focal length of the first lens L1 is f1. $0.45 \le f1/f \le 1.56$, in which a ratio of the focal length of the first lens L1 to the overall focal length is specified. Within the specified range, the first lens L1 has an appropriate positive refractive force, which is conducive to reducing systematic aberration, and is conducive to the development of the lens toward ultra-thinness and wide-angle. In an embodiment, $0.71 \le f1/f \le 1.25$ is satisfied.

A central radius of curvature of the objective side of the first lens L1 is R1, and a central radius of curvature of the image side of the first lens L1 is R2. The following relationship expression is satisfied: $-2.32 \le (R1+R2)/(R1-R2) \le -0.35$, in which the shape of the first lens is reasonably controlled, so that the first lens is able to efficiently correct the system spherical aberration. In an embodiment, $-1.45 \le (R1+R2)/(R1-R2) \le -0.43$ is satisfied.

An on-axis thickness of the first lens L1 is d1, and the optical total length of the camera optical lens 10 is TTL. The following relationship expression is satisfied: $0.04 \le d1/TTL \le 0.22$, which is conducive to the realization of ultra-thinness. In an embodiment, $0.06 \le d1/TTL \le 0.18$ is satisfied.

In this embodiment, the objective side of the second lens L2 is convex at a proximal-axis position, the image side of the second lens L2 is convex at a proximal-axis position, and the second lens L2 has a positive refractive force. In other embodiments, the objective side and image side of the second lens L2 may also be set to other concave and convex distributions.

It is defined that the overall focal length of the camera optical lens 10 is f, and the focal length of the second lens L2 is f2. $1.21 \le f2/f \le 5.86$, in which a ratio of the focal length of the second lens L2 to the overall focal length is specified. Within the specified range, the second lens L2 has an appropriate positive refractive force, which is conducive to correcting the aberration of the optical system. In an embodiment, $1.94 \le f2/f \le 4.69$ is satisfied.

A central radius of curvature of the objective side of the second lens L2 is R3, and a central radius of curvature of the image side of the second lens L2 is R4. The following relationship expression is satisfied: $-1.32 \le (R3+R4)/(R3-R4) \le 0.56$, in which the shape of the second lens L2 is specified, which is conducive to correcting the problem of on-axis aberration as the lens develops towards ultra-thinness and wide angle as the lens moves towards ultra-thinness and wide angle when it is within the range. In an embodiment, $-0.82 \le (R3+R4)/(R3-R4) \le 0.45$ is satisfied.

An on-axis thickness of the second lens L2 is d3, and the optical total length of the camera optic lens is TTL. The following relationship expression is satisfied: $0.04 \le d3/TTL \le 0.15$, in which a ratio of the on-axis thickness of the second lens L2 to the optical total length TTL of the camera optic lens 10 is specified, which is conducive to the realization of ultra-thinness. In an embodiment, $0.06 \le d3/TTL \le 0.12$ is satisfied.

In this embodiment, the objective side of the third lens L3 is convex at a proximal-axis position, the image side of the third lens L3 is concave at a proximal-axis position, and the third lens L3 has a negative refractive force. In other embodiments, the objective side and image side of the third lens L3 may also be set to other concave and convex distributions.

It is defined that the overall focal length of the camera optical lens 10 is f, and a focal length of the third lens L3 is f3. $-1.93 \le f3/f \le -0.51$, in which a ratio of the focal length of the third lens L3 to the overall focal length is specified. Within the specified range, the third lens L3 has an appropriate negative refractive force, which enables the system to have better imaging quality and lower sensitivity through a reasonable distribution of optical focal length. In an embodiment, $-1.20 \le f3/f \le -0.63$ is satisfied.

A central radius of curvature of the objective side of the third lens L3 is R5, and a central radius of curvature of the image side of the third lens L3 is R6. The following relationship expression is satisfied: $0.50 \le (R5+R6)/(R5-R6) \le 3.10$, in which the shape of the third lens L3 can be effectively controlled, which is conducive to the molding of the third lens L3 and avoids the poor molding and the generation of stresses due to the excessively large surface curvature the third of lens L3. In an embodiment, $0.80 \le (R5+R6)/(R5-R6) \le 2.48$ is satisfied.

An on-axis thickness of the third lens L3 is d5, and the optical total length of the camera optical lens 10 is TTL. The following relationship expression is satisfied: $0.01 \le d5/TTL \le 0.07$, which is conducive to the realization of ultra-thinness. In an embodiment, $0.02 \le d5/TTL \le 0.06$ is satisfied.

In this embodiment, the objective side of the fourth lens L4 is concave at a proximal-axis position, the image side of the fourth lens L4 is convex at a proximal-axis position, and the fourth lens L4 has a positive refractive force. In other embodiments, the fourth lens L4 may also have a negative refractive force, and the objective side and image side of the fourth lens L4 may also be set to other concave and convex distributions.

It is defined that the overall focal length of the camera optical lens 10 is f, and a focal length of the fourth lens L4 is f4. $-100.34 \le f4/f \le 10.67$, in which a ratio of the focal length of the fourth lens L4 to the overall focal length is specified. By reasonably distributing the optical focal length, the system has better imaging quality and lower sensitivity. In an embodiment, −62.71≤f4/f≤8.54 is satisfied.

A central radius of curvature of the objective side of the fourth lens L4 is R7, and a central radius of curvature of the image side of the fourth lens L4 is R8. The following relationship expression is satisfied: −96.58≤(R7+R8)/(R7−R8)≤231.07, in which the shape of the fourth lens L4 is specified, which is conducive to correcting the problem of on-axis aberration as the lens develops towards ultra-thinness and wide angle as the lens moves towards ultra-thinness and wide angle when it is within the range. In an embodiment, −60.36≤(R7+R8)/(R7−R8)≤184.86 is satisfied.

An on-axis thickness of the fourth lens L4 is d7, and the optical total length of the camera optical lens 10 is TTL. The following relationship expression is satisfied: 0.04≤d7/TTL≤0.30, in which a ratio of the on-axis thickness of the fourth lens L4 to the optical total length TTL of the camera optical lens 10 is specified, which is conducive to the realization of ultra-thinness. In an embodiment, 0.06≤d7/TTL≤0.24 is satisfied.

In this embodiment, the objective side of the fifth lens L5 is convex at a proximal-axis position, the image side of the fifth lens L5 is concave at a proximal-axis position, and the fifth lens L5 has a positive refractive force. In other embodiments, the objective side and image side of the fifth lens L5 may also be set to other concave and convex distributions.

It is defined that the overall focal length of the camera optical lens 10 is f, and a focal length of the fifth lens L5 is f5. 0.41≤f5/f≤1.98, in which a ratio of the focal length of the fifth lens L5 to the overall focal length is specified. Within the specified range, the fifth lens L5 has an appropriate positive refractive force, and the limitation of the fifth lens L5 can effectively make the light angle of the camera lens flat and reduce the tolerance sensitivity. In an embodiment, 0.66≤f5/f≤1.58 is satisfied.

An on-axis thickness of the fifth lens L5 is d9, and the optical total length of the camera optical lens 10 is TTL. The following relationship expression is satisfied: 0.06≤d9/TTL≤0.51, which is conducive to the realization of ultra-thinness. In an embodiment, 0.10≤d9/TTL≤0.41 is satisfied.

In this embodiment, an objective side of the sixth lens L6 is concave at a proximal-axis position, an image side of the sixth lens L6 is convex at a proximal-axis position, and the sixth lens L6 has a negative refractive force. In other embodiments, the objective side and the image side of the sixth lens L6 may also be set to other concave and convex distributions.

A central radius of curvature of the objective side of the sixth lens L6 is R11, and a central radius of curvature of the image side of the sixth lens L6 is R12. The following relationship expression is satisfied: −4.18≤(R11+R12)/(R11−R12)≤1.84, in which the shape of the sixth lens L6 specified, which is conducive to correcting the problem of on-axis aberration as the lens develops towards ultra-thinness and wide angle as the lens moves towards ultra-thinness and wide angle when it is within the range. In an embodiment, −2.61≤(R11+R12)/(R11−R12)≤1.47 is satisfied.

An on-axis thickness of the sixth lens L6 is d11, and the optical total length of the camera optical lens 10 is TTL. The following relationship expression is satisfied: 0.01≤d11/TTL≤0.05, in which a ratio of the on-axis thickness of the sixth lens L6 to the optical total length TTL of the camera optical lens 10 is specified, which is conducive to the realization of ultra-thinness. In an embodiment, 0.01≤d11/TTL≤0.04 is satisfied.

In this embodiment, the aperture value FNO of the camera optical lens 10 is less than or equal to 1.34, thereby obtaining a large aperture and good imaging performance. In an embodiment, the aperture value FNO is less than or equal to 1.31.

When the focal length, the focal length of each lens, the on-axis distance from the image side to the objective side of the relevant lens, and the on-axis thickness of the camera optical lens 10 described herein satisfy the above relationship expressions, the camera optical lens 10 can be made to have superior optical performance and can be used as a LIDAR lens.

The camera optical lens 10 of the present application will be described below by way of examples. The symbols recorded in each example are shown below. The units of the focal length, the on-axis distance, the radius of curvature, the on-axis thickness, the position of the inflection point, and the position of the stationary point are mm.

TTL: optical total length (the on-axis distance from the objective side of the first lens L1 to the imaging surface) in mm;

Aperture value FNO: a ratio of the effective focal length of the camera optical lens 10 to the diameter of the Entrance Pupil Diameter (ENPD).

In an embodiment, the lens may also be provided with an inflection point and/or a stationary point on the objective side and/or the image side, to satisfy the requirement for high-quality imaging, as described below for specific implementable embodiments.

Tables 1 and 2 show the design data of the camera optical lens 10 of the first embodiment of the present application.

TABLE 1

| | R | d | | nd | | νd | |
|---|---|---|---|---|---|---|---|
| S1 | ∞ | d0 = | −2.450 | | | | |
| R1 | 32.740 | d1 = | 4.990 | nd1 | 1.9108 | ν1 | 35.26 |
| R2 | −133.659 | d2 = | 1.515 | | | | |
| R3 | 137.384 | d3 = | 5.500 | nd2 | 1.8061 | ν2 | 40.73 |
| R4 | −179.404 | d4 = | 0.197 | | | | |
| R5 | 90.094 | d5 = | 1.900 | nd3 | 1.8467 | ν3 | 23.83 |
| R6 | 17.563 | d6 = | 8.229 | | | | |
| R7 | −14.596 | d7 = | 7.840 | nd4 | 1.8061 | ν4 | 40.73 |
| R8 | −16.704 | d8 = | 0.197 | | | | |
| R9 | 24.244 | d9 = | 11.210 | nd5 | 1.9108 | ν5 | 35.26 |
| R10 | 115.514 | d10 = | 4.123 | | | | |
| R11 | −37.697 | d11 = | 1.800 | nd6 | 1.6200 | ν6 | 36.35 |
| R12 | 0.000 | d12 = | 3.000 | | | | |
| R15 | ∞ | d13 = | 0.500 | ndg | 1.4585 | νg | 67.82 |
| R16 | ∞ | d14 = | 3.998 | | | | |

The meaning of each symbol is as follows.

S1: aperture;

R: radius of curvature of the optical surface, central radius of curvature of a lens;

R1: radius of curvature of the objective side of the first lens L1;

R2: radius of curvature of the image side of the first lens L1;

R3: radius of curvature of the objective side of the second lens L2;

R4: radius of curvature of the image side of the second lens L2;

R5: radius of curvature of the objective side of the third lens L3;

R6: radius of curvature of the image side of the third lens L3;

R7: radius of curvature of the objective side of the fourth lens L4;

R8: radius of curvature of the image side of the fourth lens L4;

R9: radius of curvature of the objective side of the fifth lens L5;

R10: radius of curvature of the image side of the fifth lens L5;

R11: radius of curvature of the objective side of the sixth lens L6;

R12: radius of curvature of the image side of the sixth lens L6;

R15: radius of curvature of the objective side of the optical filter GF;

R16: radius of curvature of the image side of the optical filter GF;

d: on-axis thickness of the lens, on-axis distance between the lenses;

d0: on-axis distance from the aperture S1 to the objective side of the first lens L1;

d1: on-axis thickness of the first lens L1;

d2: on-axis distance from the image side of the first lens L1 to the objective side of the second lens L2;

d3: on-axis thickness of the second lens L2;

d4: on-axis distance from the image side of the second lens L2 to the objective side of the third lens L3;

d5: on-axis thickness of the third lens L3;

d6: on-axis distance from the image side of the third lens L3 to the objective side of the fourth lens L4;

d7: on-axis thickness of the fourth lens L4;

d8: on-axis distance from the image side of the fourth lens L4 to the objective side of the fifth lens L5;

d9: on-axis thickness of the fifth lens L5;

d10: on-axis distance from the image side of the fifth lens L5 to the objective side of the sixth lens L6;

d11: on-axis thickness of the sixth lens L6;

d12: on-axis distance from the image side of the sixth lens L6 to the objective side of the seventh lens L7;

d13: on-axis thickness of the optical filter GF;

d14: on-axis distance from the image side to the image surface of the optical filter GF;

nd: refractive index of the line d (the line d is green light with a wavelength of 550 nm);

nd1: refractive index of the line d of the first lens L1;

nd2: refractive index of the line d of the second lens L2;

nd3: refractive index of the line d of the third lens L3;

nd4: the refractive index of the line d of the fourth lens L4;

nd5: the refractive index of the line d of the fifth lens L5;

nd6: refractive index of line d of the sixth lens L6;

ndg: refractive index of line d of the optical filter GF;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the sixth lens L6;

vg: the Abbe number of the optical filter GF.

Table 2 illustrates the aspherical data of each lens in the camera optical lens 10 according to the first embodiment of the present application.

TABLE 2

| | Cone Coefficient | Asphericity Coefficient | | | | |
|---|---|---|---|---|---|---|
| | k | A4 | A6 | A8 | A10 | A12 |
| R1 | 0.00000E+00 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 | 0.00000E+00 |
| R3 | 4.60816E+01 | −7.49580E−05 | 1.32920E−08 | −4.75910E−09 | 1.26390E−10 | −1.97150E−12 |
| R4 | 3.81565E+01 | −1.04040E−04 | 1.16910E−07 | 2.33310E−09 | −4.84180E−11 | 6.83550E−13 |
| R5 | 0.00000E+00 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 | 0.00000E+00 |
| R7 | 6.07144E−01 | 3.58970E−06 | 1.05790E−06 | −4.17670E−08 | 1.46510E−09 | −3.15280E−11 |
| R8 | 3.30597E−01 | 1.32230E−05 | 1.85390E−07 | −4.05480E−09 | 9.66870E−11 | −1.27270E−12 |
| R9 | 0.00000E+00 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 | 0.00000E+00 |

| | Cone Coefficient | Asphericity Coefficient | | | |
|---|---|---|---|---|---|
| | k | A14 | A16 | A18 | A20 |
| R1 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 |
| R3 | 4.60816E+01 | 1.92440E−14 | −1.15180E−16 | 3.86260E−19 | −5.59570E−22 |
| R4 | 3.81565E+01 | −6.60920E−15 | 3.91120E−17 | −1.27340E−19 | 1.73880E−22 |
| R5 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 |
| R7 | 6.07144E−01 | 4.43820E−13 | −3.92540E−15 | 1.97940E−17 | −4.32640E−20 |
| R8 | 3.30597E−01 | 1.03450E−14 | −5.01030E−17 | 1.31880E−19 | −1.41120E−22 |
| R9 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 |

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

k is a cone coefficient; A4, A6, A8, A10, A12, A14, A16, A18, A20 are asphericity coefficients; c is a central curvature of the optical surface; r is a perpendicular distance between a point on the aspheric curve and the optical axis, and z is the depth of the asphere (the perpendicular distance between a point on the aspheric surface at a distance of r from the optical axis and the tangent plane tangent to the apex of the aspheric surface on the optical axis).

For convenience, the aspherical surfaces of the individual lens surfaces are used as shown in the above formula (1). However, the present application is not limited to the polynomial form of the aspheric surface expressed in the formula (1).

Tables 3 and 4 show the design data of the inflection point and the stationary point of each lens in the camera optical lens 10 according to the first embodiment of the present application. P1R1, P1R2 represent the objective side and image side of the first lens L1, respectively. P2R1, P2R2 represent the objective side and image side of the second lens L2, respectively. P3R1, P3R2 represent the objective side and image side of the third lens L3, respectively. P4R1, P4R2 represent the objective side and image side of the fourth lens L4, respectively. P5R1, P5R2 represent the objective side and image side of the fifth lens L5, respectively. P6R1, P6R2 represent the objective side and image side of the sixth lens L6, respectively. The data corresponding to the "Position of Inflection Point" field is the perpendicular distance from the inflection point set on the surface of each lens to the optical axis of the camera optical lens 10. The corresponding data in the "Position of the stationary point" field is the perpendicular distance from the stationary point set on the surface of each lens to the optical axis of the camera optical lens 10.

TABLE 3

| | Number of Inflection Points | Position of Inflection Point 1 |
|---|---|---|
| P1R1 | 0 | / |
| P1R2 | 0 | / |
| P2R1 | 1 | 2.875 |
| P2R2 | 0 | / |
| P3R1 | 0 | / |
| P3R2 | 0 | / |
| P4R1 | 0 | / |
| P4R2 | 1 | 14.485 |
| P5R1 | 0 | / |
| P5R2 | 0 | / |
| P6R1 | 0 | / |
| P6R2 | 0 | / |

TABLE 4

| | Number of Stationary Points | Position of Stationary Point 1 |
|---|---|---|
| P1R1 | 0 | / |
| P1R2 | 0 | / |
| P2R1 | 1 | 4.935 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

Figure 2:
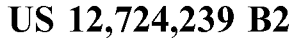
FIG. 2 is a schematic diagram showing the axial aberration of the camera optical lens shown in FIG. 1.
Figure 2:
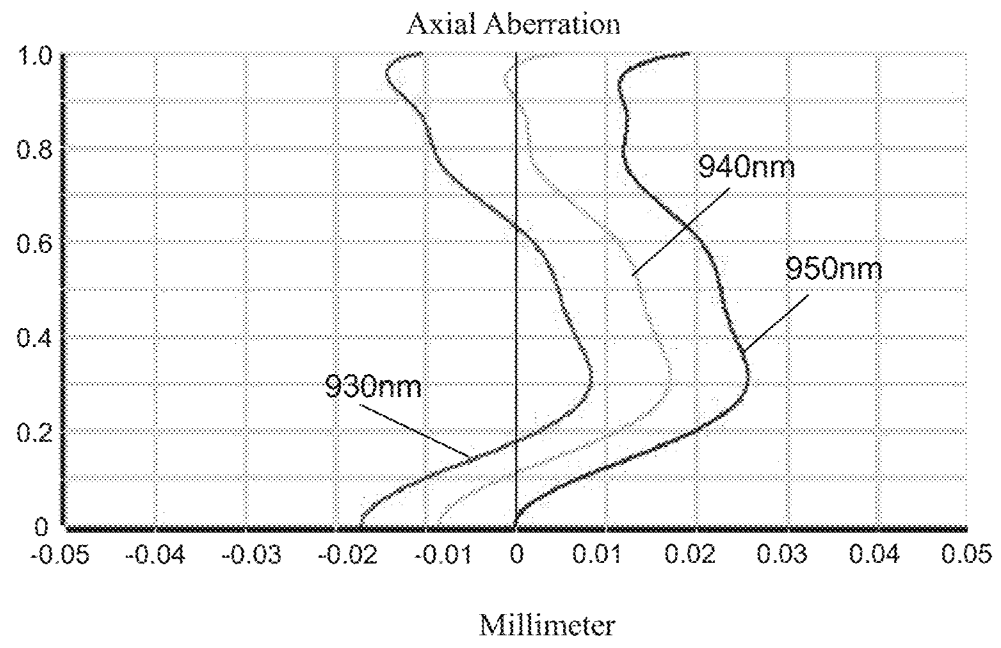
Figure 3:
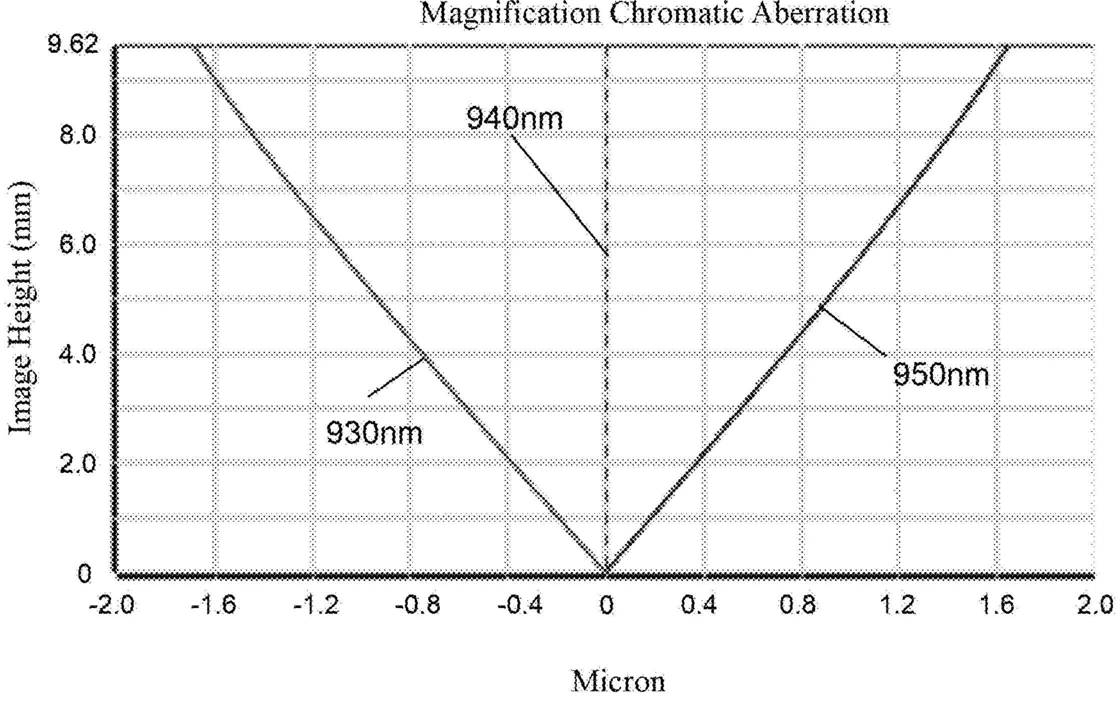
FIG. 3 is a schematic diagram showing the magnification chromatic aberration of the camera optical lens shown in FIG. 1.
Figures 4, 5:
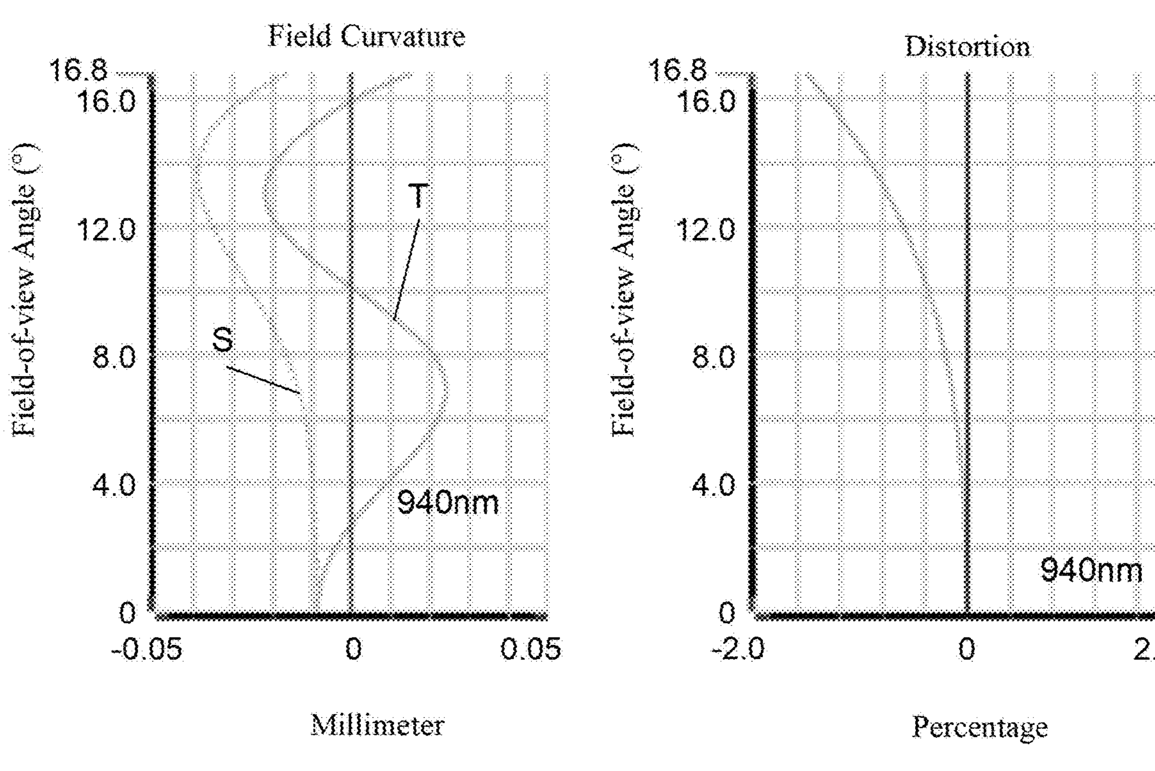
FIG. 4 is a schematic diagram showing the field curvature and distortion of the camera optical lens shown in FIG. 1.
FIG. 5 is a structural schematic diagram of the camera optical lens according to the second embodiment of the present application.

FIGS. 2 and 3 are schematic diagrams showing the axial aberration and the magnification chromatic aberration of light with wavelengths of 930 nm, 940 nm, and 950 nm, after passing through the camera optical lens 10 of the first embodiment, respectively. FIG. 4 is a schematic diagram showing the field curvature and distortion of light with a wavelength of 940 nm after passing through the camera optical lens 10 of the first embodiment. The field curvature S of FIG. 4 is a field curvature in the arc-sagittal direction, and the field curvature T is a field curvature in the meridional direction.

Table 21 in the following shows the values corresponding to the various values in each of the first embodiment, second embodiment, third embodiment, and fourth embodiment with respect to the parameters specified in the relationship expressions. As shown in Table 21, the first embodiment satisfies each of the relationship expressions.

In this embodiment, the camera optical lens 10 has an Entrance Pupil Diameter (ENPD) of 24.877 mm, a full-field-of-view image height (IH) of 9.615 mm, a field-of-view angle (FOV) of 33.59° in the diagonal direction. The camera optical lens 10 not only has superior optical performance, but also has characteristics of large aperture, ultra-thin, wide-angle and taking into account miniaturization, small aberration, small chromatic aberration, and high resolution of up to 5M. Further, it also has characteristics of a long back focal length to facilitate the assembly and the low cost.

Second Embodiment

The second embodiment is basically the same as the first embodiment, and the meaning of the symbols is the same as that of the first embodiment, and only the differences are listed below.

In this embodiment, the image side of the sixth lens L6 is concave at a proximal-axis position.

Tables 5 and 6 show the design data of the camera optical lens 20 of the second embodiment of the present application.

TABLE 5

| | R | d | | nd | | vd |
|---|---|---|---|---|---|---|
| S1 | ∞ | d0 = −2.600 | | | | |
| R1 | 35.327 | d1 = 8.633 | nd1 | 1.9108 | ν1 | 35.26 |
| R2 | −116.006 | d2 = 1.623 | | | | |
| R3 | 134.942 | d3 = 5.220 | nd2 | 1.8061 | ν2 | 40.73 |
| R4 | −131.487 | d4 = 0.190 | | | | |
| R5 | 49.499 | d5 = 1.500 | nd3 | 1.8467 | ν3 | 23.83 |
| R6 | 15.498 | d6 = 11.925 | | | | |
| R7 | −15.629 | d7 = 5.578 | nd4 | 1.8061 | ν4 | 40.73 |
| R8 | −16.290 | d8 = 4.411 | | | | |
| R9 | 23.548 | d9 = 10.009 | nd5 | 1.9108 | ν5 | 35.26 |
| R10 | 234.301 | d10 = 3.022 | | | | |
| R11 | −37.855 | d11 = 1.500 | nd6 | 1.6200 | ν6 | 36.35 |
| R12 | 51.660 | d12 = 1.823 | | | | |
| R15 | ∞ | d13 = 0.500 | ndg | 1.4585 | νg | 67.82 |
| R16 | ∞ | d14 = 1.743 | | | | |

Table 6 illustrates the aspherical data for each lens in the camera optical lens 20 according to the second embodiment of the present application.

TABLE 6

| | Cone Coefficient | Asphericity Coefficient | | | | |
|---|---|---|---|---|---|---|
| | k | A4 | A6 | A8 | A10 | A12 |
| R1 | 0.00000E+00 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 | 0.00000E+00 |
| R3 | 2.68690E+01 | −7.80850E−05 | 8.42460E−09 | −4.65950E−09 | 1.26900E−10 | −1.97030E−12 |
| R4 | −1.72849E+02 | −1.01480E−04 | 1.11030E−07 | 2.29810E−09 | −4.83300E−11 | 6.85180E−13 |
| R5 | 0.00000E+00 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 | 0.00000E+00 |
| R7 | 5.68364E−01 | 2.04070E−05 | 9.98700E−07 | −4.30790E−08 | 1.45680E−09 | −3.15600E−11 |
| R8 | 3.91365E−01 | 1.91630E−05 | 2.03820E−07 | −4.31740E−09 | 9.56810E−11 | −1.27500E−12 |
| R9 | 0.00000E+00 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 | 0.00000E+00 |

| | Cone Coefficient | Asphericity Coefficient | | | |
|---|---|---|---|---|---|
| | k | A14 | A16 | A18 | A20 |
| R1 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 |
| R3 | 2.68690E+01 | 1.92420E−14 | −1.15190E−16 | 3.86310E−19 | −5.57180E−22 |
| R4 | −1.72849E+02 | −6.59980E−15 | 3.91430E−17 | −1.27370E−19 | 1.72380E−22 |
| R5 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 |
| R7 | 5.68364E−01 | 4.43720E−13 | −3.92580E−15 | 1.97870E−17 | −4.33560E−20 |
| R8 | 3.91365E−01 | 1.03610E−14 | −4.99580E−17 | 1.32290E−19 | −1.50690E−22 |
| R9 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 |

Tables 7 and 8 show the design data of the reflection point and the stationary point of each lens in the camera optical lens 20 according to the second embodiment of the invention.

TABLE 7

| | Number of Inflection Points | Position of Inflection Point 1 |
|---|---|---|
| P1R1 | 0 | / |
| P1R2 | 0 | / |
| P2R1 | 1 | 2.825 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

TABLE 8

| | Number of Stationary Points | Position of Stationary Point 1 |
|---|---|---|
| P1R1 | 0 | / |
| P1R2 | 0 | / |
| P2R1 | 1 | 4.855 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

Figure 6:
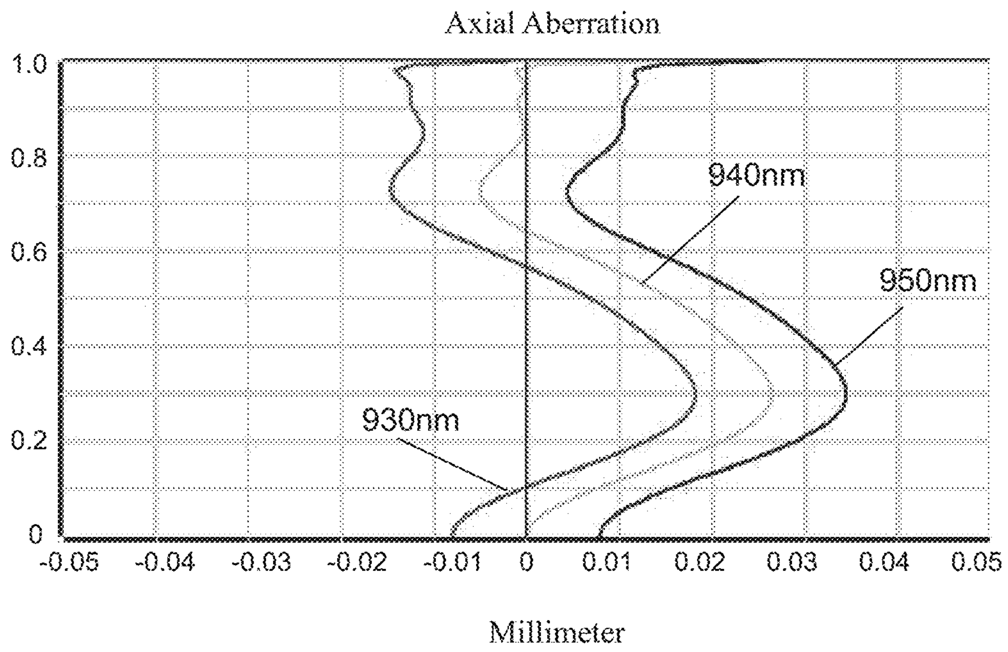
FIG. 6 is a schematic diagram showing the axial aberration of the camera optical lens shown in FIG. 5.
Figure 7:
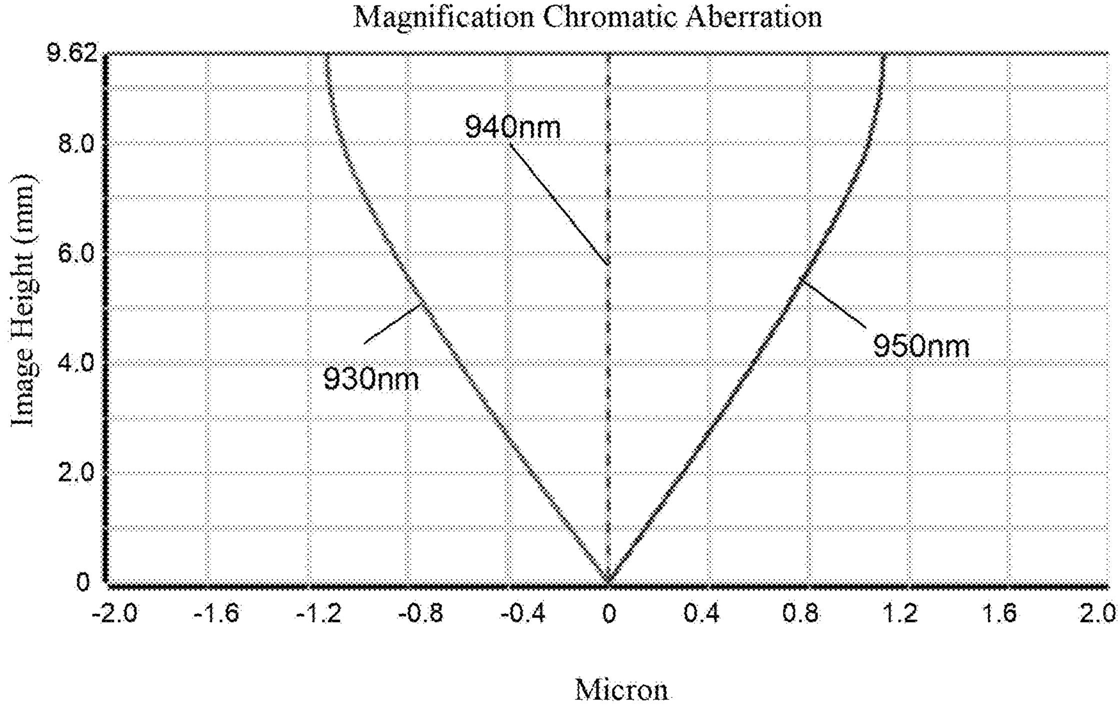
FIG. 7 is a schematic diagram showing the magnification chromatic aberration of the camera optical lens shown in FIG. 5.
Figure 8:
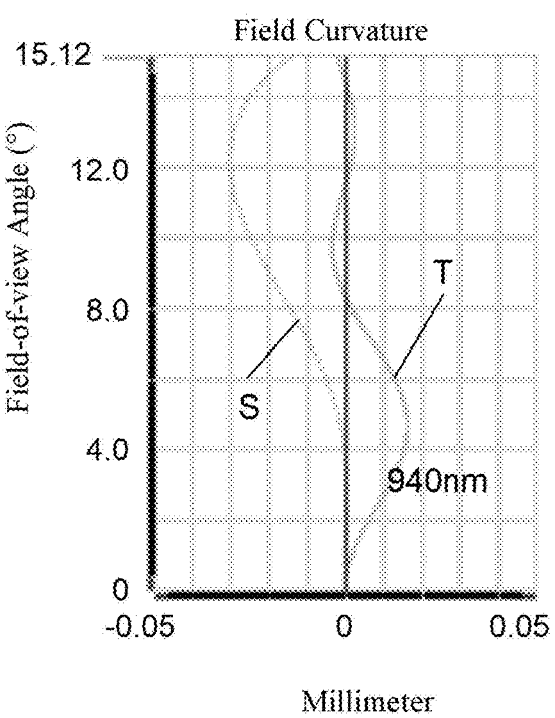
FIG. 8 is a schematic diagram showing field curvature and distortion of the camera optical lens shown in FIG. 5.
Figure 8:
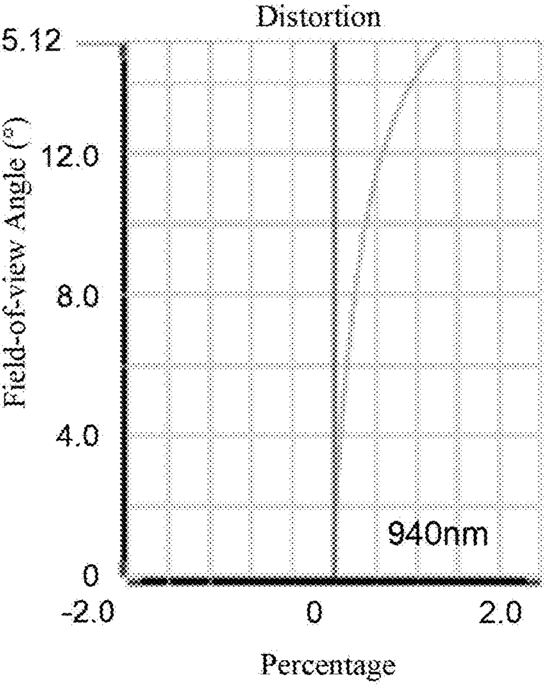
Figure 9:
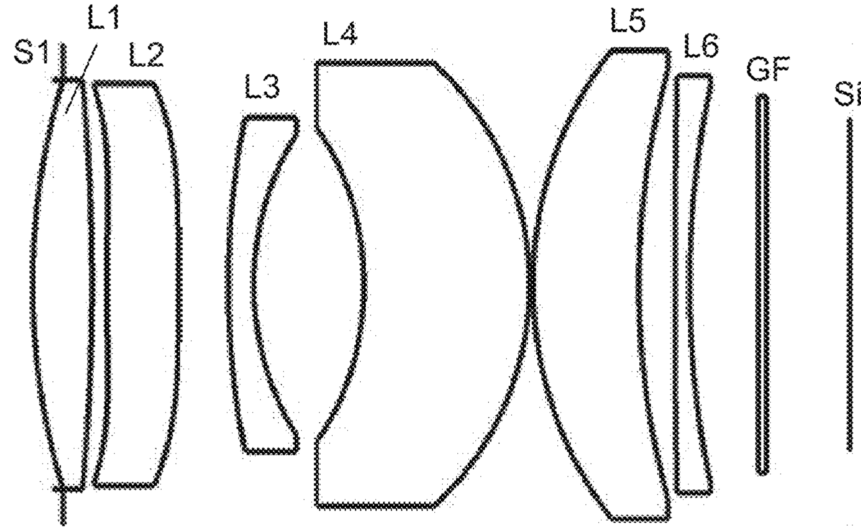
FIG. 9 is a structural schematic diagram of the camera optical lens according to the third embodiment of the present application.

FIGS. 6 and 7 are schematic diagrams showing the axial aberration and magnification chromatic aberration of light with wavelengths of 930 nm, 940 nm, and 950 nm, respectively, after passing through the camera optical lens 20 of the second embodiment. FIG. 8 is a schematic diagram showing the field curvature and distortion of the light with a wavelength of 940 nm after passing through the camera optical lens 20 of the second embodiment. The field curvature S of FIG. 8 is the field curvature in the arc-sagittal direction, and T is the field curvature in the meridional direction.

As shown in Table 21, the second embodiment satisfies each of the relationship expressions.

In this embodiment, the camera optical lens 20 has an Entrance Pupil Diameter (ENPD) of 27.091 mm, a full-field-of-view image height (IH) of 9.615 mm, a field-of-view angle (FOV) of 30.24° in the diagonal direction. The camera optical lens 20 not only has superior optical performance, but also has characteristics of large aperture, ultra-thin, wide-angle and taking into account miniaturization, small aberration, small chromatic aberration, and high resolution of up to 5M. Further, it also has characteristics of a long back focal length to facilitate the assembly and the low cost.

Third Embodiment

The third embodiment is basically the same as the first embodiment, and the meaning of the symbols is the same as that of the first embodiment, and only the differences are listed below.

In this embodiment, the objective side of the sixth lens L6 has a convex surface at a proximal-axis position, and its image side has a concave surface at a proximal-axis position.

Tables 9 and 10 show design data of the camera optical lens 30 of the third embodiment of the present application.

TABLE 9

| | R | d | | nd | | νd |
|---|---|---|---|---|---|---|
| S1 | ∞ | d0 = −2.053 | | | | |
| R1 | 39.225 | d1 = 4.000 | nd1 | 1.9108 | ν1 | 35.26 |
| R2 | −123.368 | d2 = 1.000 | | | | |
| R3 | 120.600 | d3 = 4.848 | nd2 | 1.8061 | ν2 | 40.73 |
| R4 | −585.414 | d4 = 3.323 | | | | |
| R5 | 46.890 | d5 = 1.720 | nd3 | 1.8467 | ν3 | 23.83 |
| R6 | 16.296 | d6 = 7.451 | | | | |
| R7 | −17.133 | d7 = 11.154 | nd4 | 1.8061 | ν4 | 40.73 |
| R8 | −16.912 | d8 = 0.228 | | | | |
| R9 | 22.110 | d9 = 7.159 | nd5 | 1.9108 | ν5 | 35.26 |
| R10 | 44.663 | d10 = 2.415 | | | | |
| R11 | 520.968 | d11 = 1.000 | nd6 | 1.6200 | ν6 | 36.35 |
| R12 | 52.974 | d12 = 4.661 | | | | |
| R15 | ∞ | d13 = 0.500 | ndg | 1.4585 | νg | 67.82 |
| R16 | ∞ | d14 = 5.638 | | | | |

Table 10 illustrates the aspherical data for each lens in the camera optical lens 30 of the third embodiment of the present application.

TABLE 10

| | Cone Coefficient | Asphericity Coefficient | | | | |
|---|---|---|---|---|---|---|
| | k | A4 | A6 | A8 | A10 | A12 |
| R1 | 0.00000E+00 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 | 0.00000E+00 |
| R3 | 6.96673E+01 | −6.95630E−05 | 1.79170E−08 | −4.64800E−09 | 1.26700E−10 | −1.97260E−12 |
| R4 | −1.62941E+04 | −9.07870E−05 | 1.04970E−07 | 2.19410E−09 | −4.85970E−11 | 6.85660E−13 |
| R5 | 0.00000E+00 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 | 0.00000E+00 |
| R7 | 6.71256E−01 | −1.42400E−05 | 8.48960E−07 | −4.31650E−08 | 1.46000E−09 | −3.15300E−11 |
| R8 | 2.99939E−01 | 1.49410E−05 | 1.32720E−07 | −4.09780E−09 | 9.70810E−11 | −1.27300E−12 |
| R9 | 0.00000E+00 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 | 0.00000E+00 |

| | Cone Coefficient | Asphericity Coefficient | | | |
|---|---|---|---|---|---|
| | k | A14 | A16 | A18 | A20 |
| R1 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 |
| R3 | 6.96673E+01 | 1.92260E−14 | −1.15280E−16 | 3.86300E−19 | −5.51510E−22 |
| R4 | −1.62941E+04 | −6.59040E−15 | 3.92010E−17 | −1.27240E−19 | 1.71110E−22 |
| R5 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 |
| R7 | 6.71256E−01 | 4.43850E−13 | −3.92650E−15 | 1.97630E−17 | −4.32900E−20 |
| R8 | 2.99939E−01 | 1.03360E−14 | −5.01310E−17 | 1.32010E−19 | −1.40530E−22 |
| R9 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 |

Tables 11 and 12 show the design data of the reflection point and the stationary point of each lens in the camera optical lens 30 according to the third embodiment of the present application.

TABLE 11

| | Number of Inflection Points | Position of Inflection Point 1 |
|---|---|---|
| P1R1 | 0 | / |
| P1R2 | 0 | / |
| P2R1 | 1 | 3.255 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

TABLE 12

| | Number of Stationary Points | Position of Stationary Point 1 |
|---|---|---|
| P1R1 | 0 | / |
| P1R2 | 0 | / |
| P2R1 | 1 | 5.585 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

Figure 10:
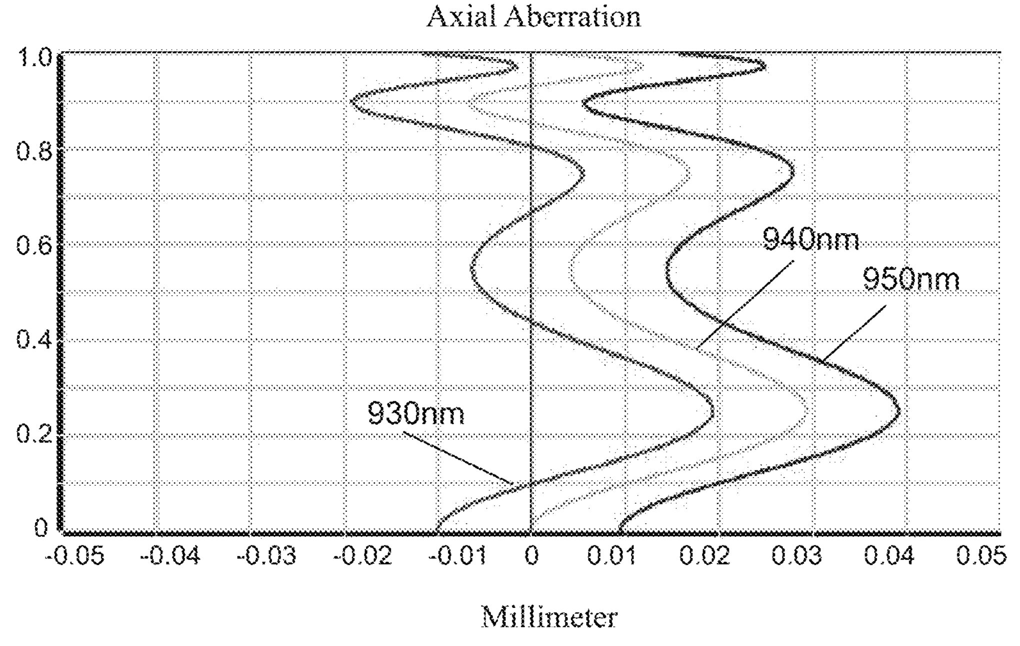
FIG. 10 is a schematic diagram showing the axial aberration of the camera optical lens shown in FIG. 9.
Figure 11:
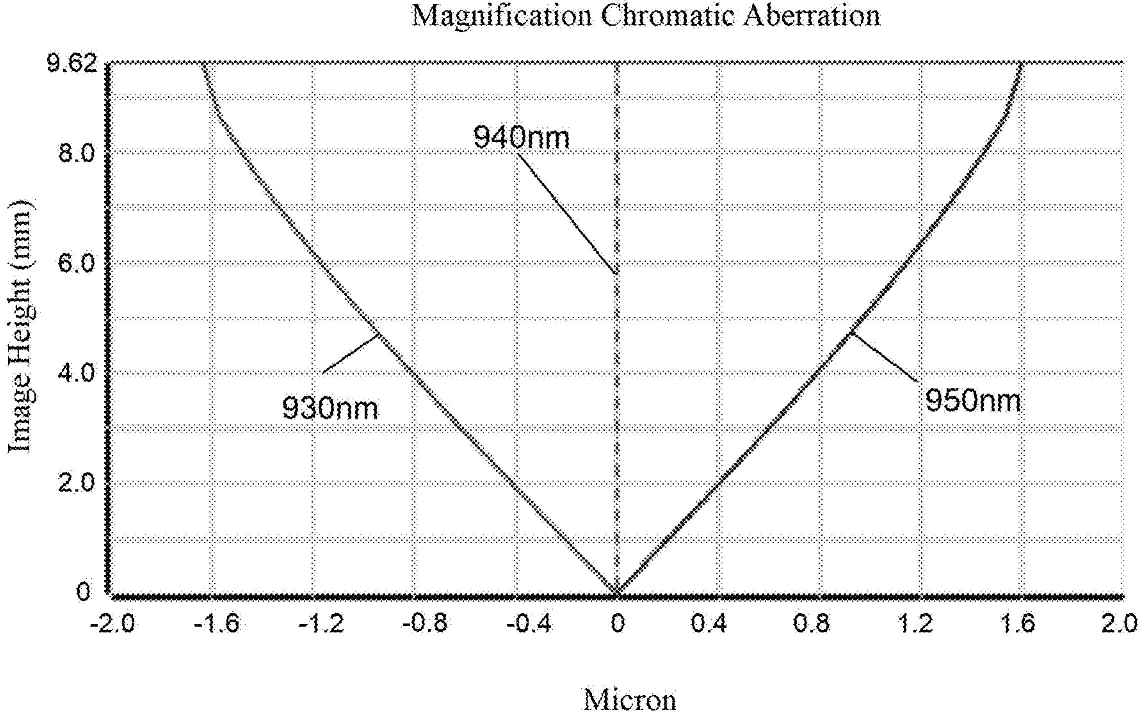
FIG. 11 is a schematic diagram showing the magnification chromatic aberration of the camera optical lens shown in FIG. 9.
Figure 12:
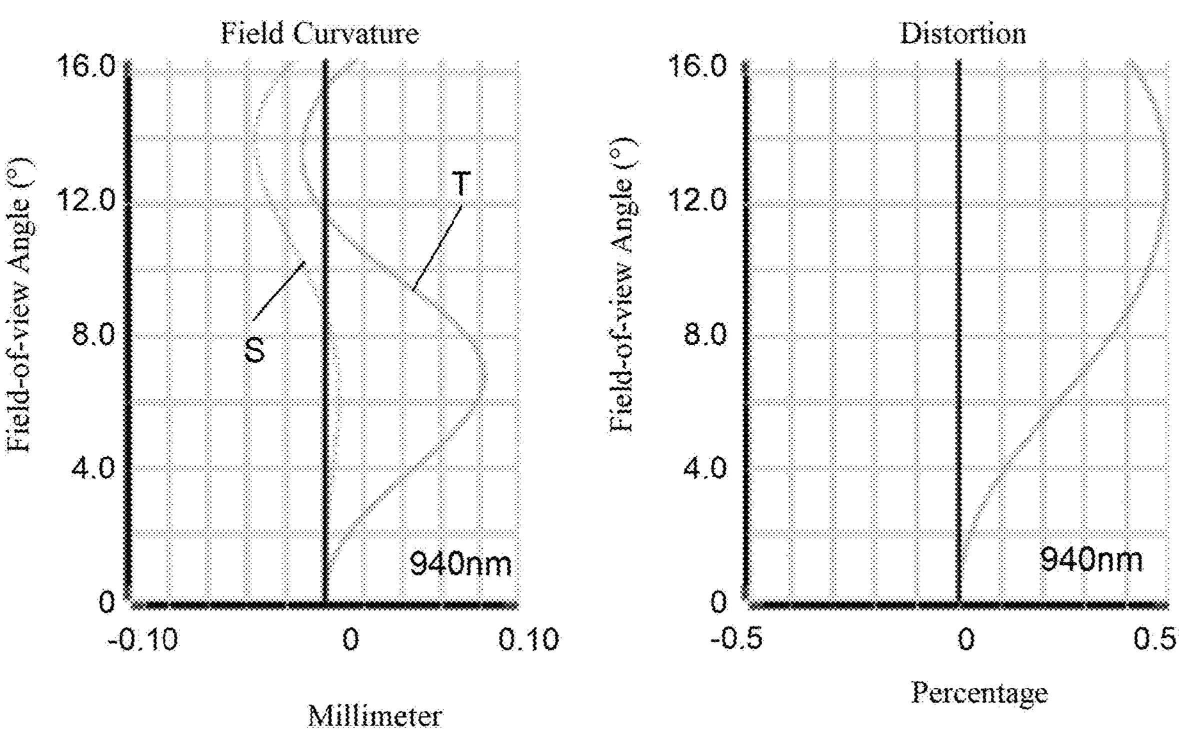
FIG. 12 is a schematic diagram showing field curvature and distortion of the camera optical lens shown in FIG. 9.
Figure 13:
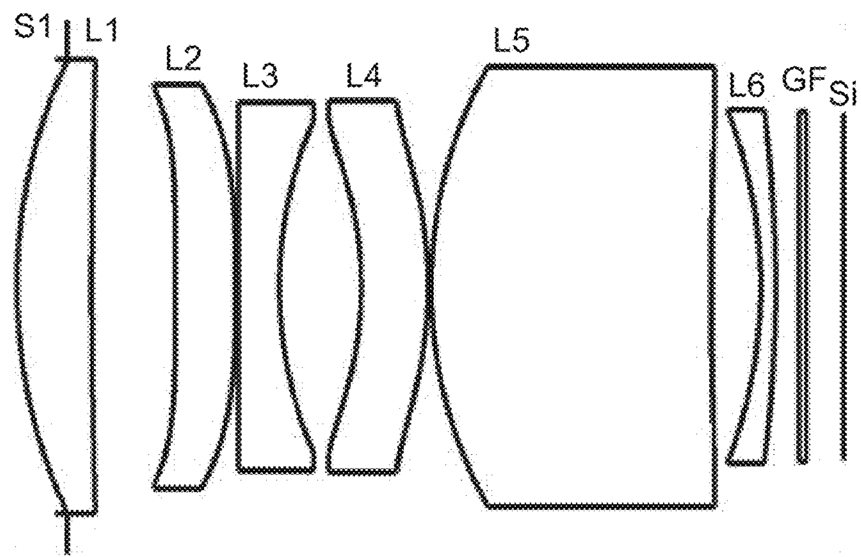
FIG. 13 is a structural schematic diagram of the camera optical lens according to the fourth embodiment of the present application.

FIGS. 10 and 11 are schematic diagrams showing the axial aberration and magnification chromatic aberration of light with wavelengths of 930 nm, 940 nm, and 950 nm, respectively, after passing through the camera optical lens 30 of the third embodiment. FIG. 12 is a schematic diagram showing the field curvature and distortion of light with a wavelength of 940 nm after passing through the camera optical lens 30 of the third embodiment. The field curvature S of FIG. 12 is the field curvature in the arc-sagittal direction, and T is the field curvature in the meridional direction.

As shown in Table 21, the third embodiment satisfies each of the relationship expressions.

In this embodiment, the camera optical lens 30 has an Entrance Pupil Diameter (ENPD) of 25.075 mm, a full field-of-view image height (IH) of 9.615 mm, and a field-of-view angle (FOV) of 32.74° in the diagonal direction. The camera optical lens 30 not only has superior optical performance, but also has characteristics of large aperture, ultra-thin, wide-angle and taking into account miniaturization, small aberration, small chromatic aberration, and high resolution of up to 5M. Further, it also has characteristics of a long back focal length to facilitate the assembly and the low cost.

Fourth Embodiment

The fourth embodiment is basically the same as the first embodiment, and the meaning of the symbols is the same as that of the first embodiment, and only the differences are listed below.

In this embodiment, the image side of the first lens L1 has a concave surface at the proximal-axis position, the objective side of the third lens L3 has a concave surface at the proximal-axis position, and the fourth lens L4 has a negative refractive force.

Tables 13 and 14 show the design data of the camera optical lens 40 of the fourth embodiment of the present application.

TABLE 13

| | R | d | | nd | | vd |
|---|---|---|---|---|---|---|
| S1 | ∞ | d0 = −3.400 | | | | |
| R1 | 27.980 | d1 = 5.048 | nd1 | 1.9108 | v1 | 35.26 |
| R2 | 374.256 | d2 = 5.605 | | | | |
| R3 | 287.620 | d3 = 4.108 | nd2 | 1.8061 | v2 | 40.73 |
| R4 | −130.378 | d4 = 0.190 | | | | |
| R5 | −21230.104 | d5 = 2.756 | nd3 | 1.8467 | v3 | 23.83 |
| R6 | 21.563 | d6 = 5.567 | | | | |
| R7 | −18.983 | d7 = 4.519 | nd4 | 1.8061 | v4 | 40.73 |
| R8 | −21.268 | d8 = 0.196 | | | | |
| R9 | 23.859 | d9 = 18.945 | nd5 | 1.9108 | v5 | 35.26 |
| R10 | 225.615 | d10 = 3.330 | | | | |
| R11 | −25.371 | d11 = 1.000 | nd6 | 1.6200 | v6 | 36.35 |
| R12 | −71.987 | d12 = 1.572 | | | | |
| R15 | ∞ | d13 = 0.500 | ndg | 1.4585 | vg | 67.82 |
| R16 | ∞ | d14 = 2.543 | | | | |

Table 14 illustrates aspherical data for each lens in the camera optical lens 40 according to the fourth embodiment of the present application.

TABLE 14

| | Cone Coefficient | Asphericity Coefficient | | | | |
|---|---|---|---|---|---|---|
| | k | A4 | A6 | A8 | A10 | A12 |
| R1 | 0.00000E+00 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 | 0.00000E+00 |
| R3 | −8.90422E+01 | −7.62050E−05 | −2.09580E−09 | −4.82380E−09 | 1.26160E−10 | −1.97190E−12 |
| R4 | 6.22418E+01 | −1.04610E−04 | 9.78800E−08 | 2.28320E−09 | −4.82830E−11 | 6.86020E−13 |
| R5 | 0.00000E+00 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 | 0.00000E+00 |
| R7 | 5.70426E−01 | 1.17750E−05 | 1.14580E−06 | −4.11410E−08 | 1.46360E−09 | −3.15640E−11 |
| R8 | −1.01102E−01 | 2.38160E−05 | 2.86350E−07 | −3.51990E−09 | 9.78210E−11 | −1.27630E−12 |
| R9 | 0.00000E+00 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 | 0.00000E+00 |

TABLE 14-continued

| | Cone Coefficient | Asphericity Coefficient | | | |
|---|---|---|---|---|---|
| | k | A14 | A16 | A18 | A20 |
| R1 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 |
| R3 | −8.90422E+01 | 1.92480E−14 | −1.15110E−16 | 3.86980E−19 | −5.53610E−22 |
| R4 | 6.22418E+01 | −6.59000E−15 | 3.92150E−17 | −1.27110E−19 | 1.70350E−22 |
| R5 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 |
| R7 | 5.70426E−01 | 4.43550E−13 | −3.92630E−15 | 1.97980E−17 | −4.32730E−20 |
| R8 | −1.01102E−01 | 1.03130E−14 | −5.01290E−17 | 1.32520E−19 | −1.62350E−22 |
| R9 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 |

Tables 15 and 16 show the design data of the reflection point and the stationary point of each lens in the camera optical lens 40 according to the fourth embodiment of the present application.

TABLE 15

| | Number of Inflection Points | Position of Inflection Point 1 | Position of Inflection Point 2 |
|---|---|---|---|
| P1R1 | 0 | / | / |
| P1R2 | 0 | / | / |
| P2R1 | 1 | 1.945 | / |
| P2R2 | 0 | / | / |
| P3R1 | 0 | / | / |
| P3R2 | 0 | / | / |
| P4R1 | 2 | 7.775 | 10.285 |
| P4R2 | 2 | 8.115 | 12.245 |
| P5R1 | 0 | / | / |
| P5R2 | 0 | / | / |
| P6R1 | 0 | / | / |
| P6R2 | 0 | / | / |

TABLE 16

| | Number of Stationary Points | Position of Stationary Point 1 |
|---|---|---|
| P1R1 | 0 | / |
| P1R2 | 0 | / |
| P2R1 | 1 | 3.345 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

Figure 14:
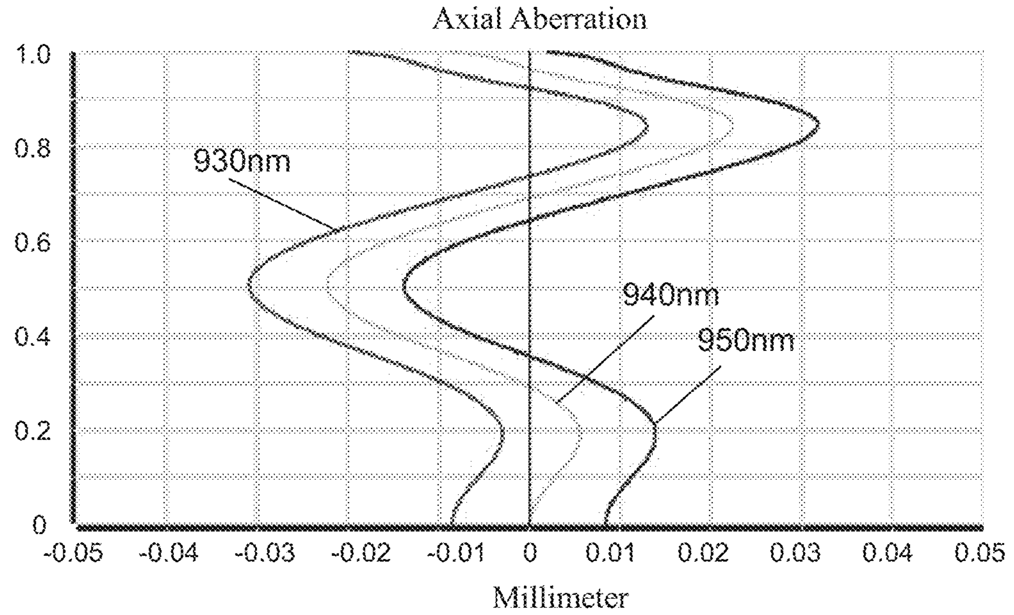
FIG. 14 is a schematic diagram showing the axial aberration of the camera optical lens shown in FIG. 13.
Figure 15:
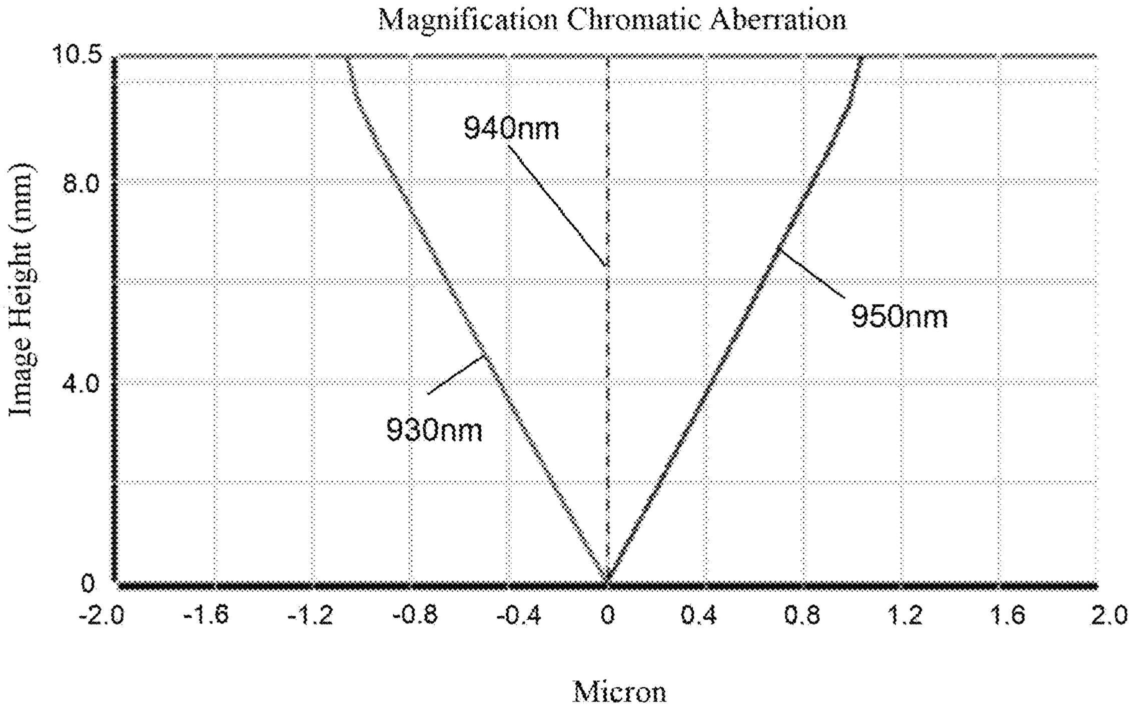
FIG. 15 is a schematic diagram showing the magnification chromatic aberration of the camera optical lens shown in FIG. 13.
Figure 16:
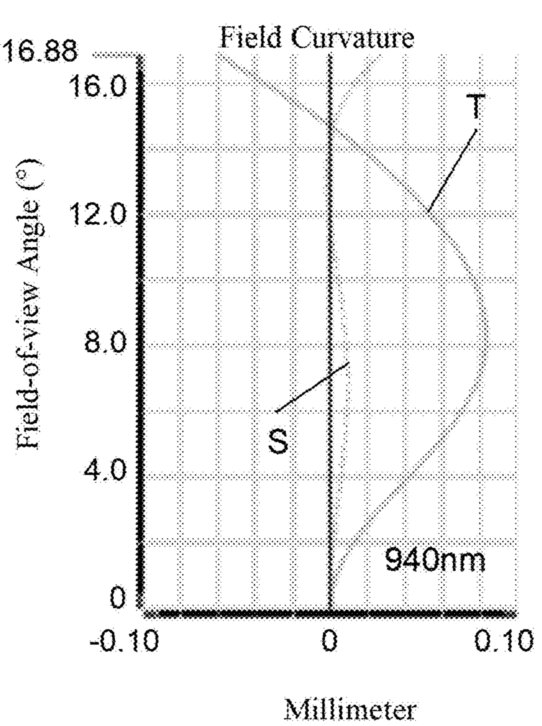
FIG. 16 is a schematic diagram showing the field curvature and distortion of the camera optical lens shown in FIG. 13.
Figure 16:
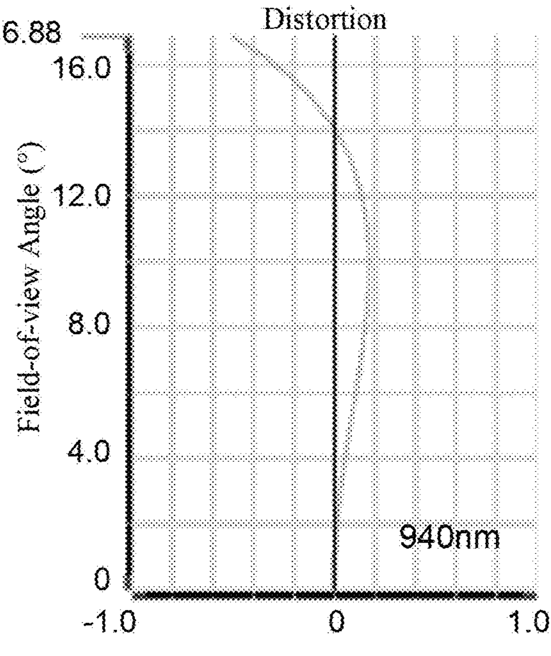
Figure 17:
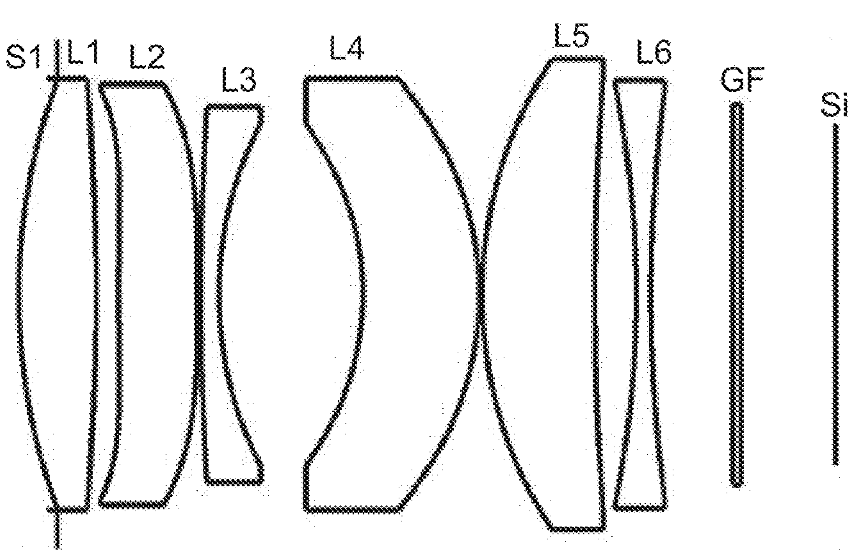
FIG. 17 is a structural schematic diagram of the camera optical lens according to the first comparison example.

FIGS. 14 and 15 are schematic diagrams showing the axial aberration and magnification chromatic aberration of light with wavelengths of 930 nm, 940 nm, and 950 nm, respectively, after passing through the camera optical lens 40 of the fourth embodiment. FIG. 16 is a schematic diagram showing the field curvature and distortion of light having a wavelength of 940 nm after passing through the camera optical lens 40 of the fourth embodiment. The field curvature S of FIG. 16 is the field curvature in the arc-sagittal direction, and the field curvature T is the field curvature in the meridional direction.

Table 21 in the following lists the values corresponding to each of the relationship expressions in this embodiment in accordance with the above relationship expressions. It is clear that the camera optical lens 40 of this embodiment satisfies the above-described relationship expressions.

In this embodiment, the camera optical lens 40 has an Entrance Pupil Diameter (ENPD) of 26.755 mm, a full-field-of-view image height (IH) of 9.615 mm, and a field-of-view angle (FOV) of 30.96° in the diagonal direction. The camera optical lens 40 not only has superior optical performance, but also has characteristics of large aperture, ultra-thin, wide-angle and taking into account miniaturization, small aberration, small chromatic aberration, and high resolution of up to 5M. Further, it also has characteristics of a long back focal length to facilitate the assembly and the low cost.

First Comparison Example

The first comparison example is basically the same as the first embodiment, and the meaning of the symbols is the same as that of the first embodiment, and only the differences are listed below.

In the first comparison example, the image side of the sixth lens L6 is concave at the proximal-axis position.

Tables 17 and 18 show the design data of the camera optical lens 50 of the first comparison example.

TABLE 17

| | R | d | nd | | νd | |
|---|---|---|---|---|---|---|
| S1 | ∞ | d0 = −2.615 | | | | |
| R1 | 32.981 | d1 = 5.161 | nd1 | 1.9108 | ν1 | 35.26 |
| R2 | −140.113 | d2 = 1.519 | | | | |
| R3 | 117.469 | d3 = 5.270 | nd2 | 1.8061 | ν2 | 40.73 |
| R4 | −293.085 | d4 = 0.190 | | | | |
| R5 | 152.095 | d5 = 1.228 | nd3 | 1.8467 | ν3 | 23.83 |
| R6 | 20.113 | d6 = 9.646 | | | | |
| R7 | −14.828 | d7 = 7.760 | nd4 | 1.8061 | ν4 | 40.73 |
| R8 | −16.630 | d8 = 0.196 | | | | |
| R9 | 23.418 | d9 = 7.540 | nd5 | 1.9108 | ν5 | 35.26 |
| R10 | 152.612 | d10 = 2.769 | | | | |
| R11 | −56.072 | d11 = 1.000 | nd6 | 1.6200 | ν6 | 36.35 |
| R12 | 82.574 | d12 = 5.452 | | | | |
| R15 | ∞ | d13 = 0.500 | ndg | 1.4585 | νg | 67.82 |
| R16 | ∞ | d14 = 6.371 | | | | |

Table 18 illustrates the aspherical data of each lens in the camera optical lens 50 of the first comparison example.

TABLE 18

| | Cone Coefficient | Asphericity Coefficient | | | | |
|---|---|---|---|---|---|---|
| | k | A4 | A6 | A8 | A10 | A12 |
| R1 | 0.00000E+00 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 | 0.00000E+00 |
| R3 | 4.54663E+01 | −7.53150E−05 | 2.30200E−08 | −4.79290E−09 | 1.26030E−10 | −1.97310E−12 |
| R4 | 9.50764E+01 | −1.04110E−04 | 1.04960E−07 | 2.30310E−09 | −4.84010E−11 | 6.84320E−13 |
| R5 | 0.00000E+00 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 | 0.00000E+00 |
| R7 | 5.47721E−01 | 9.06990E−06 | 1.06590E−06 | −4.16530E−08 | 1.46590E−09 | −3.15350E−11 |
| R8 | 3.17844E−01 | 1.91240E−05 | 1.90310E−07 | −3.97550E−09 | 9.71060E−11 | −1.27130E−12 |
| R9 | 0.00000E+00 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 | 0.00000E+00 |

| | Cone Coefficient | Asphericity Coefficient | | | |
|---|---|---|---|---|---|
| | k | A14 | A16 | A18 | A20 |
| R1 | 0.00000E+00 | 0.00000E+00 | 0.00000E+00 | 0.00000E+00 | 0.00000E+00 |
| R2 | 0.00000E+00 | 0.00000E+00 | 0.00000E+00 | 0.00000E+00 | 0.00000E+00 |
| R3 | 4.54663E+01 | 1.92400E−14 | −1.15160E−16 | 3.86570E−19 | −5.56690E−22 |
| R4 | 9.50764E+01 | −6.60320E−15 | 3.91420E−17 | −1.27280E−19 | 1.72990E−22 |
| R5 | 0.00000E+00 | 0.00000E+00 | 0.00000E+00 | 0.00000E+00 | 0.00000E+00 |
| R6 | 0.00000E+00 | 0.00000E+00 | 0.00000E+00 | 0.00000E+00 | 0.00000E+00 |
| R7 | 5.47721E−01 | 4.43650E−13 | −3.92630E−15 | 1.98000E−17 | −4.29590E−20 |
| R8 | 3.17844E−01 | 1.03500E−14 | −5.00810E−17 | 1.31990E−19 | −1.40740E−22 |
| R9 | 0.00000E+00 | 0.00000E+00 | 0.00000E+00 | 0.00000E+00 | 0.00000E+00 |
| R10 | 0.00000E+00 | 0.00000E+00 | 0.00000E+00 | 0.00000E+00 | 0.00000E+00 |
| R11 | 0.00000E+00 | 0.00000E+00 | 0.00000E+00 | 0.00000E+00 | 0.00000E+00 |
| R12 | 0.00000E+00 | 0.00000E+00 | 0.00000E+00 | 0.00000E+00 | 0.00000E+00 |

Tables 19 and 20 illustrate the design data of the reflection point and the stationary point of each lens in the camera optical lens 50 of the first comparison example.

TABLE 19

| | Number of Inflection Points | Position of Inflection Point 1 |
|---|---|---|
| P1R1 | 0 | / |
| P1R2 | 0 | / |
| P2R1 | 1 | 3.135 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

TABLE 20

| | Number of Stationary Points | Position of Stationary Point 1 |
|---|---|---|
| P1R1 | 0 | / |
| P1R2 | 0 | / |
| P2R1 | 1 | 5.365 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

Figure 18:
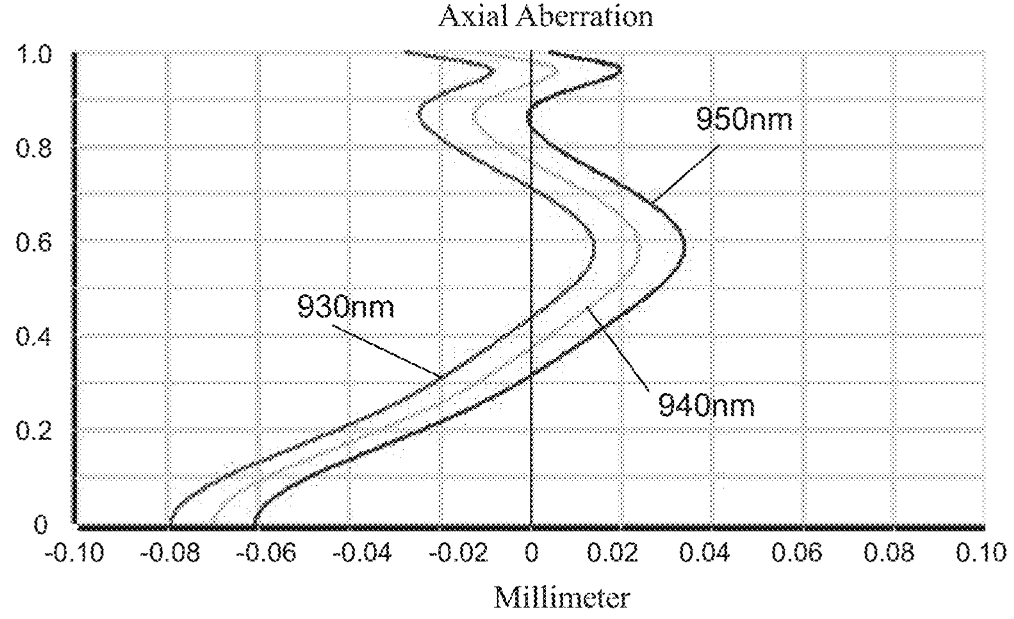
FIG. 18 is a schematic diagram showing the axial aberration of the camera optical lens shown in FIG. 17.
Figure 19:
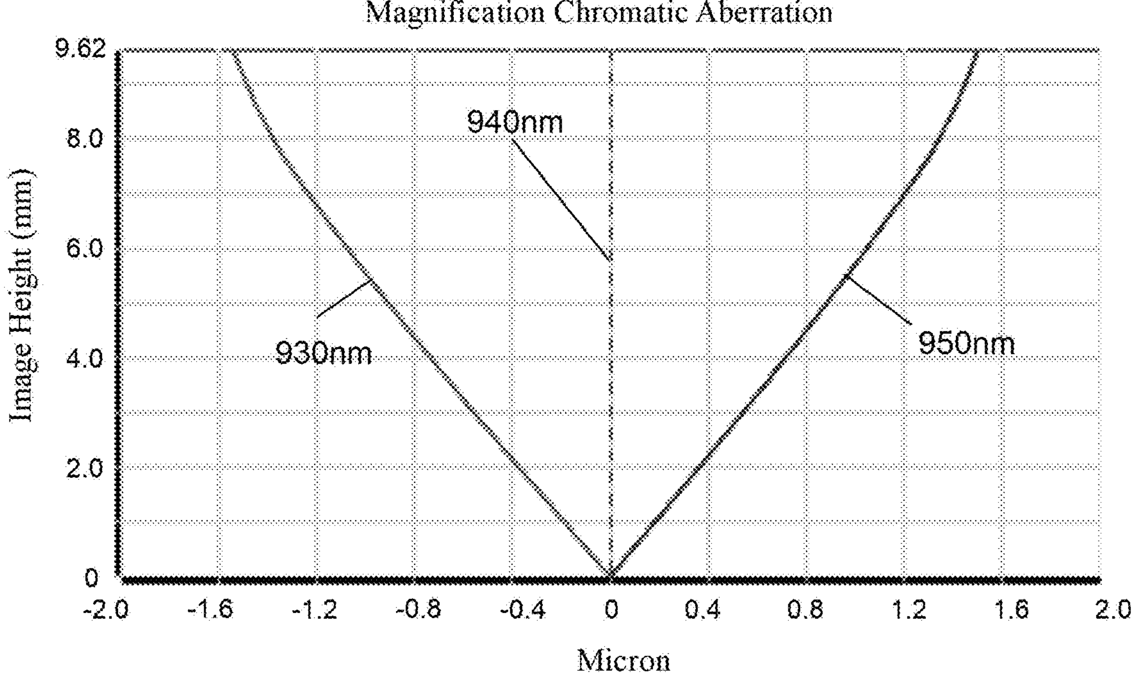
FIG. 19 is a schematic diagram showing the magnification chromatic aberration of the camera optical lens shown in FIG. 17.
Figure 20:
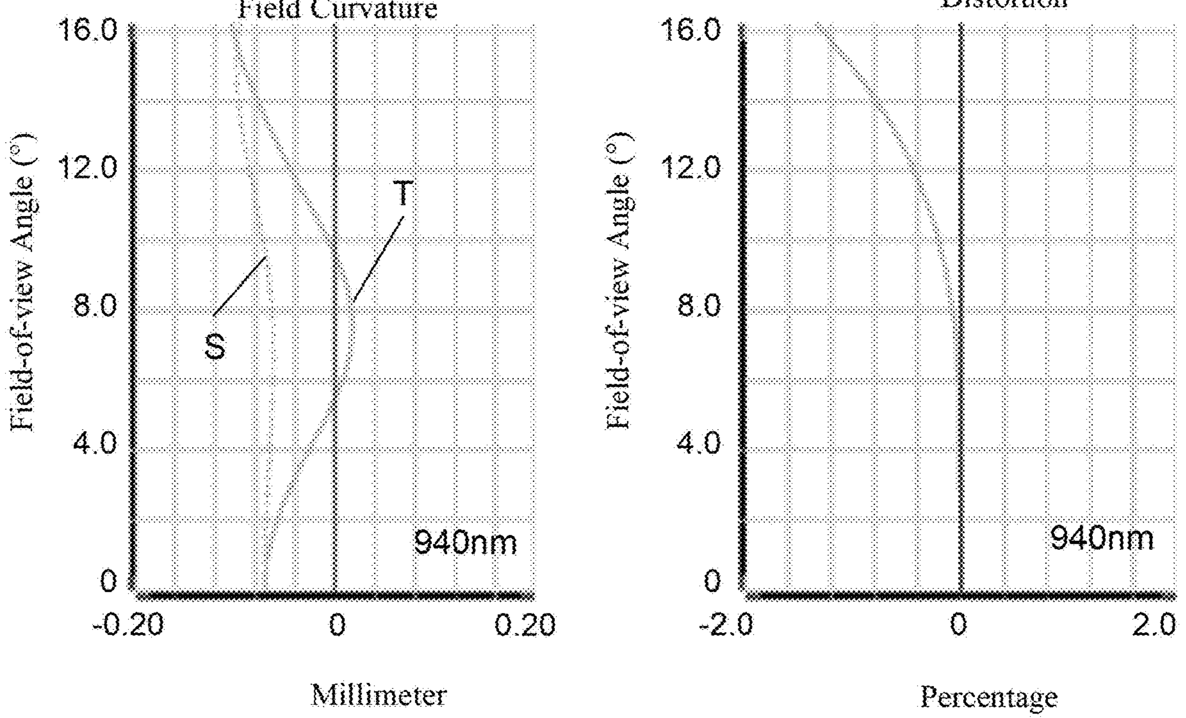
FIG. 20 is a schematic diagram showing field curvature and distortion of the camera optical lens shown in FIG. 17.

FIGS. 18 and 19 are schematic diagrams showing the axial aberration and magnification chromatic aberration of light with wavelengths of 930 nm, 940 nm, and 950 nm, respectively, after passing through the camera optical lens 50 of the camera optical lens 50 of the first comparison example. FIG. 20 shows a schematic diagram of field curvature and distortion of light having a wavelength of 940 nm after passing through the camera optical lens 50 of the first comparison example. The field curvature S of FIG. 20 is the field curvature in the arc-sagittal direction, and the field curvature T is the field curvature in the meridional direction.

Table 21 in the following lists the values corresponding to each of the relationship expressions in the first comparison example in accordance with the above relationship expressions. Obviously, the camera optical lens 50 of the first comparison example does not satisfy the above relationship expression: 0.07 BF/TTL≤0.20.

In the first comparison example, the camera optical lens 50 has an Entrance Pupil Diameter (ENPD) of 25.765 mm, a full-field-of-view image height (IH) of 9.615 mm, and a field-of-view angle (FOV) of 32.41° in the diagonal direction. The aberration of the camera optical lens 50 is adequately corrected, which hinders the reduction of the front aperture, resulting in suboptimal optical performance.

TABLE 21

| Parameters and relationship expressions | First Embodiment | Second Embodiment | Third Embodiment | Fourth Embodiment | First Comparison Example |
|---|---|---|---|---|---|
| f6/f | −1.93 | −1.02 | −3.00 | −1.88 | −1.65 |
| BF/TTL | 0.14 | 0.07 | 0.20 | 0.08 | 0.23 |
| R10/R9 | 4.76 | 9.95 | 2.02 | 9.46 | 6.52 |
| d2/d4 | 7.69 | 8.54 | 0.30 | 29.50 | 8.00 |
| d6/d5 | 4.33 | 7.95 | 4.33 | 2.02 | 7.86 |
| f5/d9 | 2.92 | 2.88 | 6.00 | 1.52 | 4.03 |
| D/H/FOV | 0.08 | 0.10 | 0.08 | 0.09 | 0.09 |
| D | 26.28 | 28.51 | 26.48 | 28.16 | 27.17 |
| IH | 16.80 | 9.62 | 9.62 | 9.62 | 9.62 |
| FOV | 33.59 | 30.24 | 32.74 | 30.96 | 32.40 |
| f | 32.340 | 35.218 | 32.597 | 34.782 | 33.495 |
| f1 | 30.066 | 31.365 | 33.939 | 33.855 | 30.519 |
| f2 | 99.568 | 85.310 | 127.379 | 114.424 | 107.101 |
| f3 | −27.048 | −28.204 | −31.396 | −26.392 | −28.519 |
| f4 | 230.085 | 179.942 | 71.668 | −1744.982 | 193.793 |
| f5 | 32.697 | 28.863 | 42.944 | 28.802 | 30.348 |
| f6 | −62.384 | −35.926 | −97.667 | −65.364 | −55.114 |
| f12 | 24.022 | 24.334 | 27.322 | 28.027 | 24.575 |
| Fno | 1.30 | 1.30 | 1.30 | 1.30 | 1.30 |
| TTL | 54.999 | 57.677 | 55.097 | 55.879 | 54.602 |
| IH | 9.615 | 9.615 | 9.615 | 9.615 | 9.615 |
| FOV | 33.59° | 30.24° | 32.74° | 30.96° | 32.41° |

FOV: field of view in the diagonal direction of the camera optical lens.

It can be understood by those of ordinary skill in the art that each of the above embodiments is a specific embodiment for realizing the present application, and that various changes can be made thereto in form and detail in practical application without departing from the spirit and scope of the present application.

What is claimed is:

1. A camera optical lens, comprising, in order from an objective side to an image side: a first lens, a second lens, a third lens, a fourth lens, a fifth lens, and a sixth lens;

wherein a focal length of the sixth lens is f6; a focal length of the camera optical lens is f; an on-axis distance from an image surface of the sixth lens to an image surface of the camera optical lens is BF; an optical total length of the camera optical lens is TTL; a central radius of curvature of an image side of the fifth lens is R10; a central radius of curvature of an objective side of the fifth lens is R9; an on-axis distance from an image side of the first lens to an objective side of the second lens is d2; an on-axis distance from an image side of the second lens to an objective side of the third lens is d4, a focal length of the fifth lens is f5; an on-axis thickness of the fifth lens is d9; and the following relationship expressions are satisfied:

$$-3.00 \leqq f6/f \leqq -1.00;$$

$$0.07 \leqq BF/TTL \leqq 0.20;$$

$$2.00 \leqq R10/R9 \leqq 10.00;$$

$$0.30 \leqq d2/d4 \leqq 30.00.$$

$$1.50 \leqq f5/d9 \leqq 6.00.$$

2. The camera optical lens of claim 1, wherein an on-axis distance from an image side of the third lens to an objective side of the fourth lens is d6; an on-axis thickness of the third lens is d5, and the following relationship expression is satisfied:

$$2.00 \leqq d6/d5 \leqq 8.00.$$

3. The camera optical lens of claim 1, wherein a diameter of an objective side of the first lens is D; an image height of the camera optical lens is IH; a field of view in a diagonal direction of the camera optical lens is FOV, and the following relationship expression is satisfied:

$$D/IH/FOV \leqq 0.10.$$

4. The camera optical lens of claim 1, wherein the first lens has a positive refractive force, and an objective side of the first lens is convex at a proximal-axis position;

a focal length of the first lens is f1; a central radius of curvature of the objective side of the first lens is R1; a central radius of curvature of the image side of the first lens is R2; an on-axis thickness of the first lens is d1, and the following relationship expressions are satisfied:

$$0.45 \leq f1/f \leq 1.56;$$

$$-2.32 \leq (R1+R2)/(R1-R2) \leq -0.35;$$

$$0.04 \leq d1/TTL \leq 0.22.$$

5. The camera optical lens of claim 1, wherein the second lens has a positive refractive force; and an objective side of the second lens is convex at a proximal-axis position, and an image side of the second lens is convex at a proximal-axis position;

a focal length of the second lens is f2; a central radius of curvature of the objective side of the second lens is R3;

a central radius of curvature of the image side of the second lens is R4; an on-axis thickness of the second lens is d3; and the optical total length of the camera optical lens is TTL, and the following relationship expressions are satisfied:

$$1.21 \leq f2/f \leq 5.86;$$

$$-1.32 \leq (R3+R4)/(R3-R4) \leq 0.56;$$

$$0.04 \leq d3/TTL \leq 0.15.$$

6. The camera optical lens of claim 1, wherein the third lens has a negative refractive force, and an image side of the third lens is concave at a proximal-axis position;

a focal length of the third lens is f3; a central radius of curvature of the objective side of the third lens is R5; a central radius of curvature of the image side of the third lens is R6; an on-axis thickness of the third lens is d5; the optical total length of the camera optic lens is TTL, and the following relationship expressions are satisfied:

$$-1.93 \leq f3/f \leq -0.51;$$

$$0.50 \leq (R5+R6)/(R5-R6) \leq 3.10;$$

$$0.01 \leq d5/TTL \leq 0.07.$$

7. The camera optical lens of claim 1, wherein an objective side of the fourth lens is concave at a proximal-axis position, and an image side of the fourth lens is convex at a proximal-axis position;

a focal length of the fourth lens is f4; a central radius of curvature of the objective side of the fourth lens is R7; a central radius of curvature of the image side of the fourth lens is R8; an on-axis thickness of the fourth lens is d7; an optical total length of the camera optic lens is TTL, and the following relationship expressions are satisfied:

$$-100.34 \leq f4/f \leq 10.67;$$

$$-96.58 \leq (R7+R8)/(R7-R8) \leq 231.07;$$

$$0.04 \leq d7/TTL \leq 0.30.$$

8. The camera optical lens of claim 1, wherein the fifth lens has a positive refractive force; an objective side of the fifth lens is convex at a proximal-axis position, and an image side of the fifth lens is concave at a proximal-axis position;

a focal length of the fifth lens is f5; an on-axis thickness of the fifth lens is d9; an optical total length of the camera optic lens is TTL, and the following relationship expressions are satisfied:

$$0.41 \leq f5/f \leq 1.98;$$

$$0.06 \leq d9/TTL \leq 0.51.$$

9. The camera optical lens of claim 1, wherein the sixth lens has a negative refractive force; a central radius of curvature of an objective side of the sixth lens is R11; a central radius of curvature of an image side of the sixth lens is R12; an on-axis thickness of the sixth lens is d11; an optical total length of the camera optical lens is TTL, and the following relationship expressions are satisfied:

$$-4.18 \leq (R11+R12)/(R11-R12) \leq 1.84;$$

$$0.01 \leq d11/TTL \leq 0.05.$$

10. The camera optical lens of claim 1, wherein the first lens, third lens, fifth lens and sixth lens are made of glass materials.

* * * * *